United States Patent [19]
Iriuchijima et al.

[11] Patent Number: 5,971,584
[45] Date of Patent: Oct. 26, 1999

[54] PRODUCTION CONTROL APPARATUS AND A PRODUCTION CONTROL METHOD

[75] Inventors: Ken Iriuchijima; Mutsumi Fujihara, both of Yokohama; Hideo Sakamoto, Kanagawa-ken, all of Japan

[73] Assignee: Kabushiki Kaisha Toshiba, Kawasaki, Japan

[21] Appl. No.: 08/919,272

[22] Filed: Aug. 28, 1997

[30] Foreign Application Priority Data

Aug. 30, 1996 [JP] Japan ..................... 8-230613

[51] Int. Cl.[6] ........................................ G06F 19/00
[52] U.S. Cl. ................... 364/468.07; 364/468.06
[58] Field of Search ............ 364/468.01, 468.02, 364/468.03, 468.05–468.08, 468.09, 468.22, 468.23, 478.01, 478.02; 705/8, 9

[56] References Cited

U.S. PATENT DOCUMENTS

| | | | |
|---|---|---|---|
| 5,260,868 | 11/1993 | Gupta et al. | 364/468.06 |
| 5,500,803 | 3/1996 | Munro et al. | 364/468.05 |
| 5,751,580 | 5/1998 | Chi | 364/468.07 |

FOREIGN PATENT DOCUMENTS

| | | |
|---|---|---|
| 64-34644 | 2/1989 | Japan . |
| 2-36037 | 2/1990 | Japan . |
| 3-14675 | 1/1991 | Japan . |
| 4-270459 | 9/1992 | Japan . |
| 6-328351 | 11/1994 | Japan . |

OTHER PUBLICATIONS

Menju, Satoshi "An Adjustment Method for Balanced Production Scheduling Problem" in '95 *Dissertations of the Production Scheduling Symposium*, The Institute of System Control and Information Engineers, Oct. 2, 1995, Kyoto, Japan,pp. 187–192.

*Primary Examiner*—William Grant
*Assistant Examiner*—Steven R. Garland
*Attorney, Agent, or Firm*—Banner & Witcoff, Ltd.

[57] ABSTRACT

A production control is applied to control a production machine for producing a product from a material in a process divided into a plurality of steps. The execution numbers are counted on a per-step basis. A priority order is allocated on the basis of the counted execution numbers. The information relating to the priority order is output to the production machine. The production machine can select the next step in accordance with the input priority order. The execution numbers can be properly controlled by such control method on the per-step basis.

80 Claims, 28 Drawing Sheets

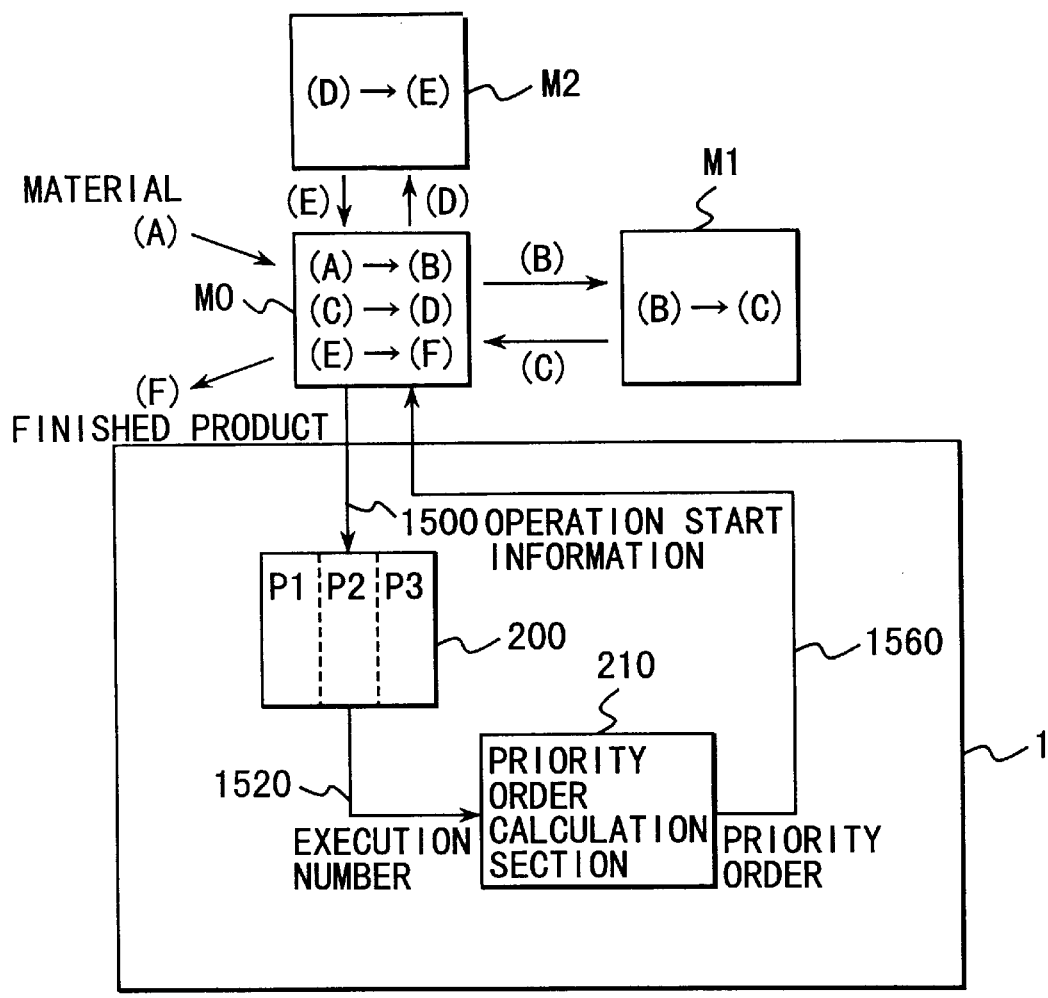
F I G. 1

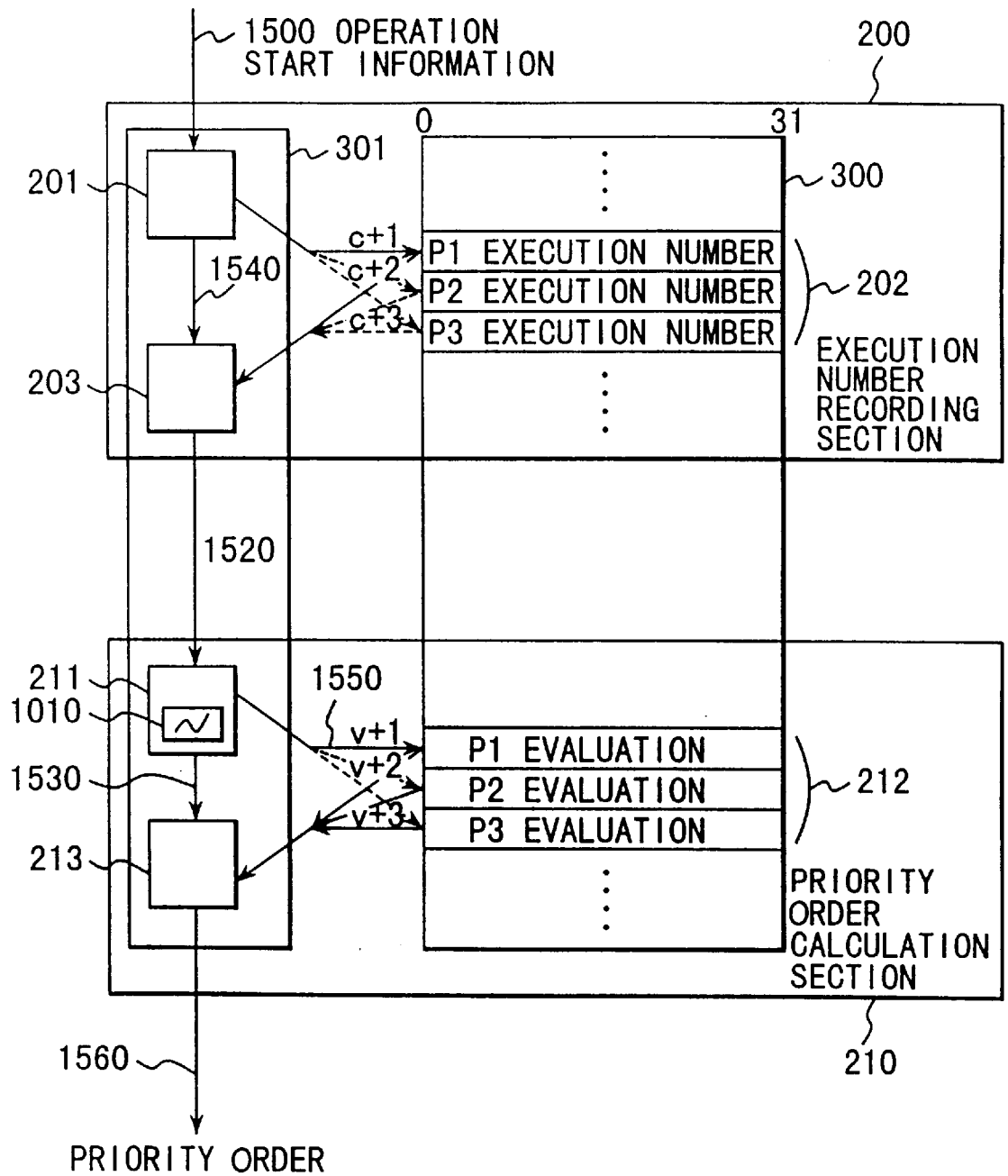
F I G. 2

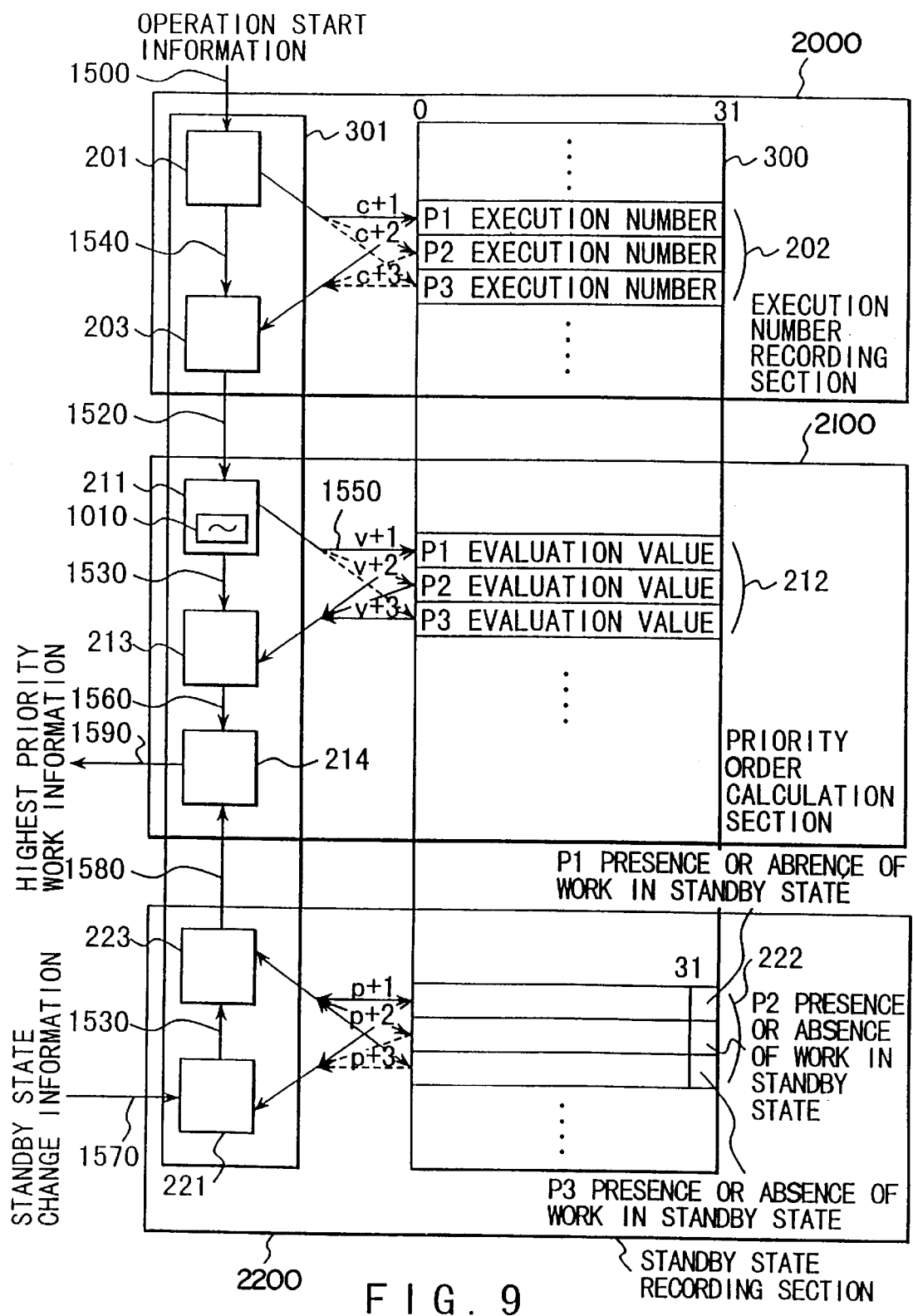
F I G. 9

FIG. 17A

WORK ARRIVAL INFORMATION

| 0 | 7 | 39 | 55 |
|---|---|---|---|
| STEP CODE | ARRIVAL TIME | WORK ID | |

STANDBY STATE INFORMATION  1580

| 0 | 15 | 16 | 31 |
|---|---|---|---|
| STEP CODE (P1) | STANDBY NUMBER OF WORKS(P1) | | |
| ARRIVAL TIME (FIRST WORK OF P1) | | | |
| | | WORK ID | |
| ARRIVAL TIME (SECOND WORK FOR P1) | | | |
| | | WORK ID | |
| STEP CODE (P2) | STANDBY NUMBER OF WORKS(P2) | | |
| ARRIVAL TIME (SECOND WORK FOR P2) | | | |
| | | WORK ID | |
| ⋮ | | | |
| STEP CODE (P3) | STANDBY NUMBER OF WORKS(P3) | | |
| ARRIVAL TIME (FIRST WORK FOR P3) | | | |
| | | WORK ID | |
| ⋮ | | | |

FIG. 17C

HIGHEST WORK INFORMATION (WORK ID)

| 0 | 15 |
|---|---|
| WORK ID | |

~1600

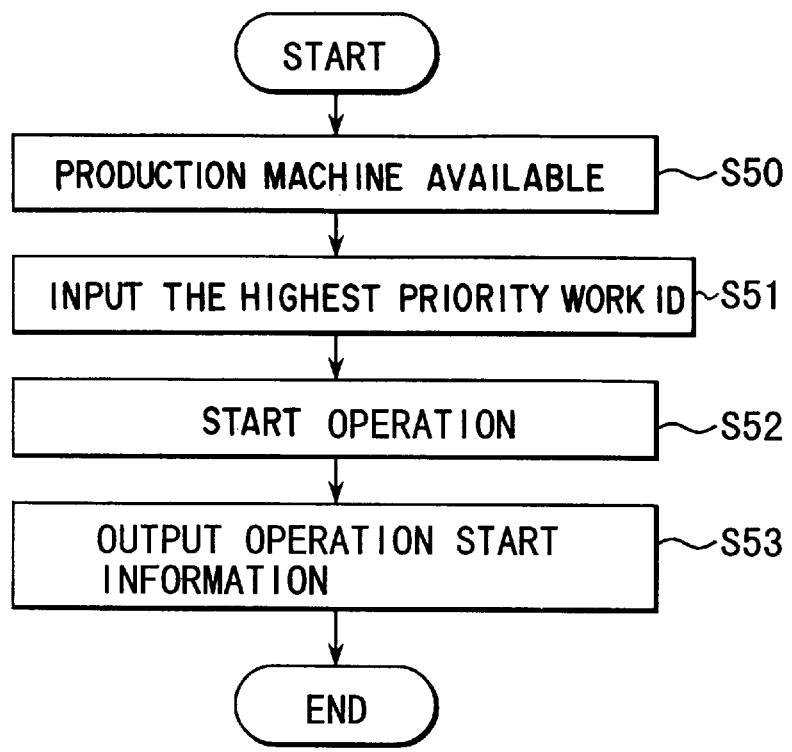
F I G. 19
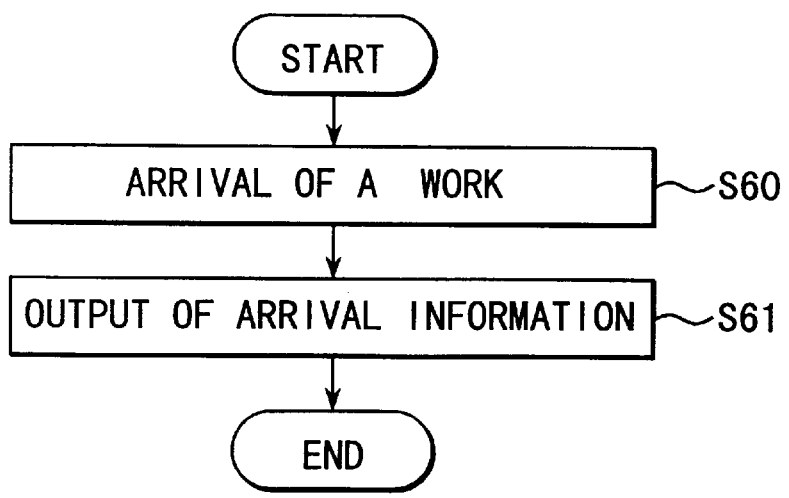
F I G. 20

FIG. 23A PRODUCTION RATIO 1630

| TYPE CODE 1 | PRODUCTION RATIO 1 |
|---|---|
| TYPE CODE 2 | PRODUCTION RATIO 2 |

0 — 15 16 — 31

FIG. 23B TARGET STANDBY STATE 1620

| TYPE STEP CODE 1 | TARGET NUMBER 1 |
|---|---|
| TYPE STEP CODE 2 | TARGET NUMBER 2 |
| TYPE STEP CODE 3 | TARGET NUMBER 3 |

0 — 15 16 — 31

FIG. 23C INITIAL VALUE 1525

| TYPE STEP CODE 1 | INITIAL VALUE 1 |
|---|---|
| TYPE STEP CODE 2 | INITIAL VALUE 2 |
| TYPE STEP CODE 3 | INITIAL VALUE 3 |

0 — 15 16 — 47

FIG. 23D OPERATION START INFORMATION 1500

| TYPE STEP CODE | START TIME | WORK ID |
|---|---|---|

0 — 15 16 — 47 48 — 63

FIG. 23E EXECUTING STEP

| TYPE STEP CODE | 1540 |
|---|---|

0 — 15

FIG. 23F EXECUTION NUMBER 1520

| TYPE STEP CODE | WEIGHTED EXECUTION NUMBER |
|---|---|

0 — 15 16 — 47

FIG. 23G PRIORITY ORDER

| TYPE STEP CODE 1 | TYPE STEP CODE 2 | TYPE STEP CODE 3 | 1560 |
|---|---|---|---|

0 — 15 16 — 31 32 — 47

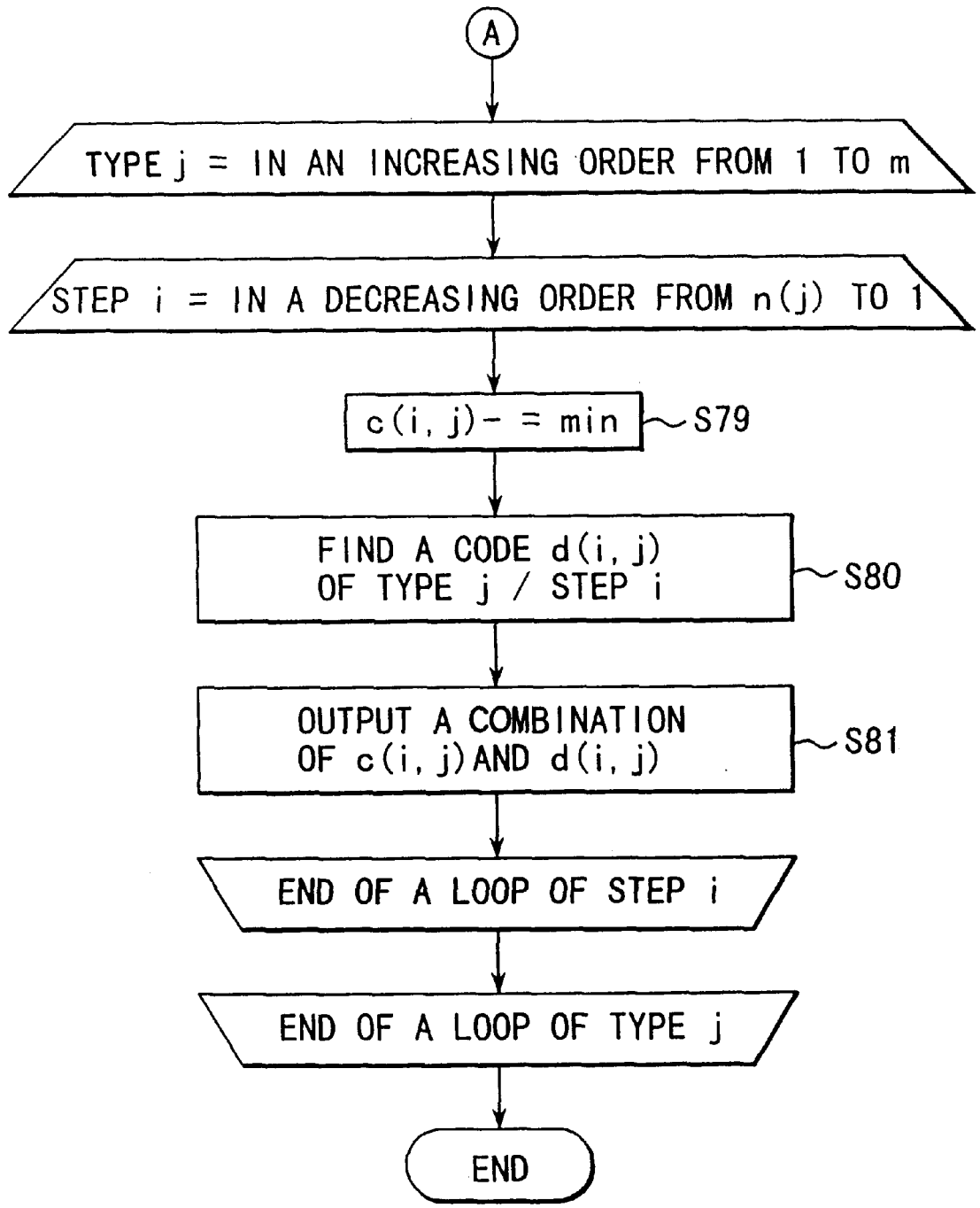
F I G. 25

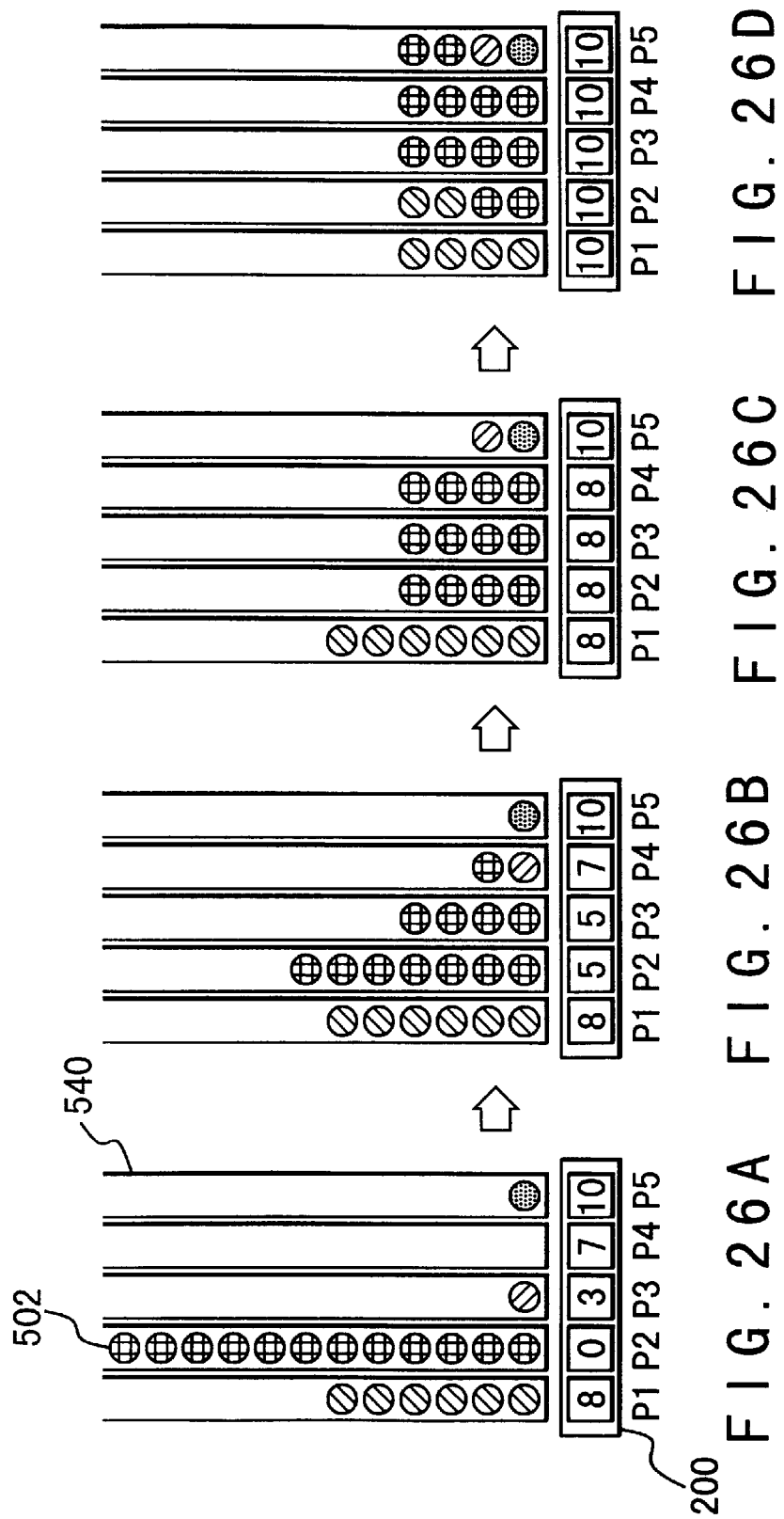

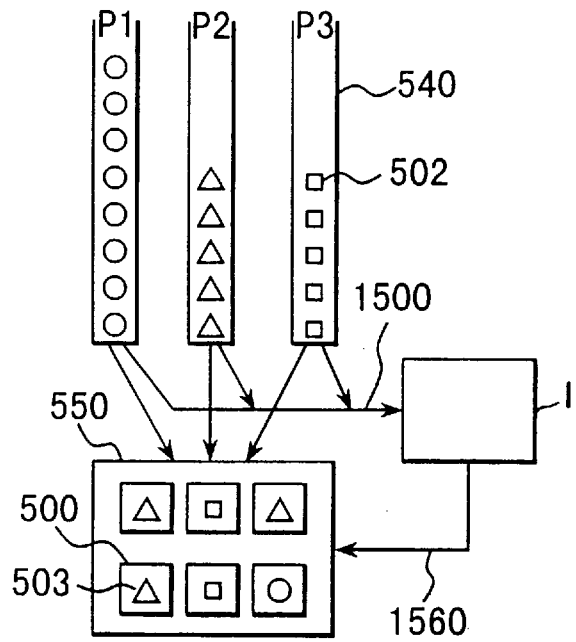
F I G. 29
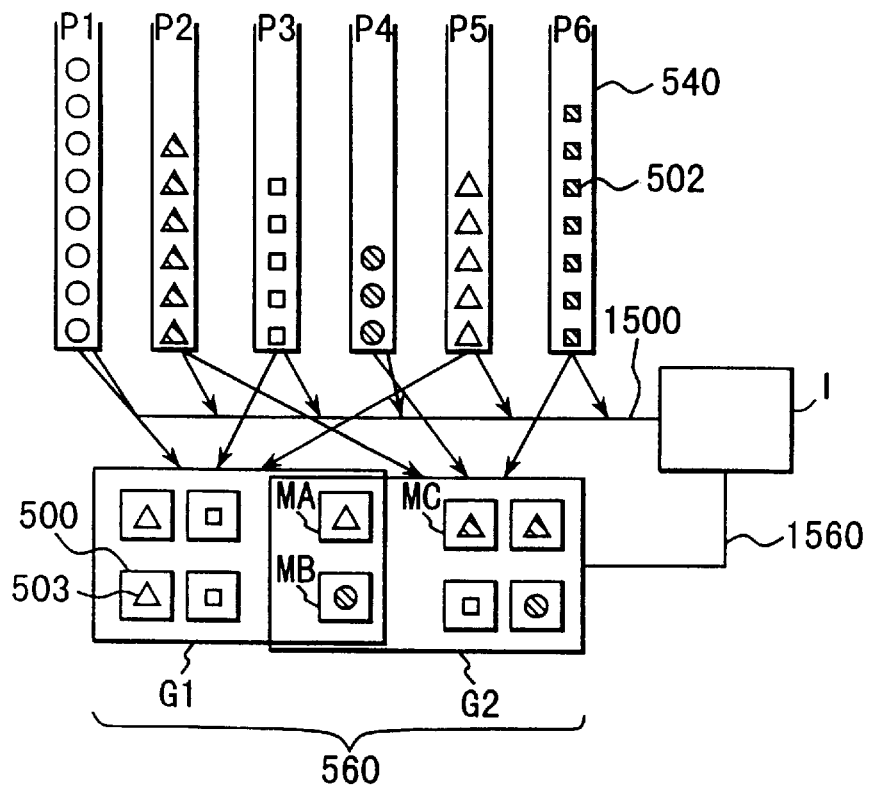
F I G. 30

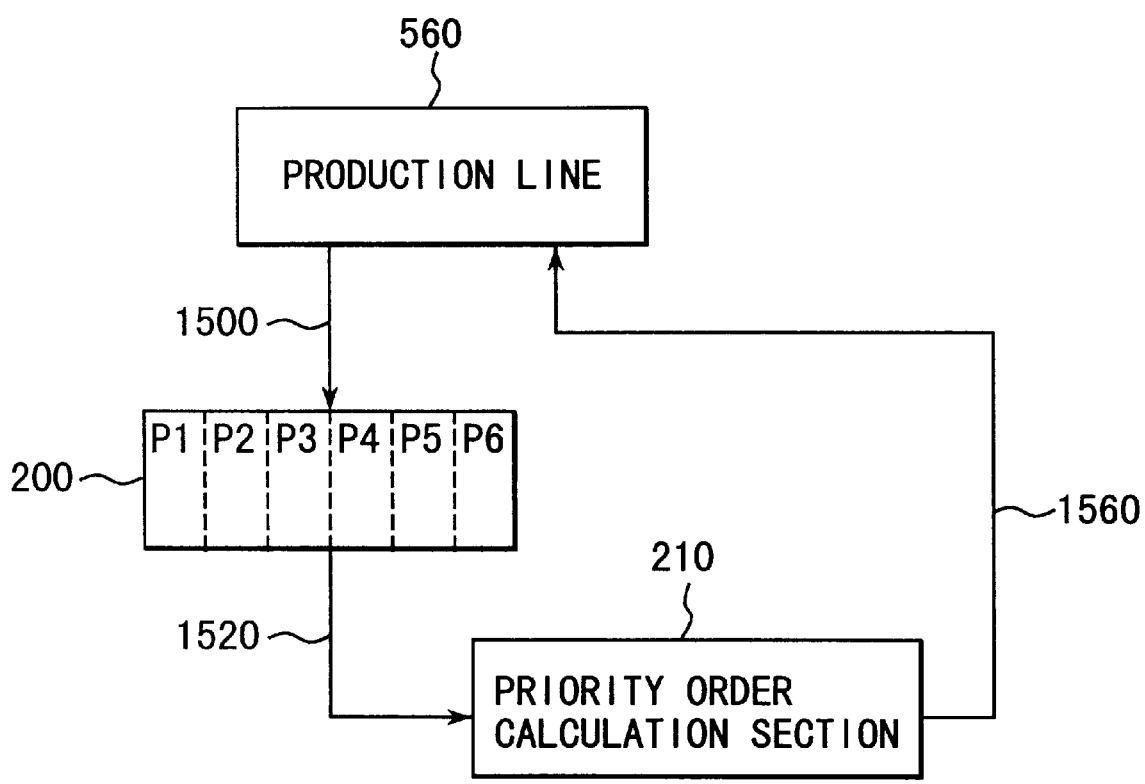
F I G. 31

PRODUCTION CONTROL APPARATUS AND A PRODUCTION CONTROL METHOD

BACKGROUND OF THE INVENTION

The present invention relates to a production control apparatus and method for effectively producing one type or a plurality of types of products from a material.

A CAM (computer aided manufacturing) or CIM (Computer Integrated Manufacturing) system is directed to making a production through the utilization of a computer and its main function is to perform production control.

As such production procedure, there are known various kinds of procedures. For a multi-product assembly line for producing many types of products as in the production of semiconductor devices, it is essential to control their production ratio. As such a control method, a procedure is designed for leveling the production pace.

The production ratio control method as disclosed, for example, in JPN PAT APPLN KOKAI PUBLICATION NOs. 64-34644 and 6-328351 is directed to controlling the production ratio of types of products by dynamically updating predetermined sequence data.

Further, the method as disclosed in JPN PAT APPLN KOKAI PUBLICATION NO. 2-36037 is such that, in order to prevent too many and too few of work (intermediate products, semi-finished products and unfinished products) being waited for a subsequent step or steps—the standby numbers—, the order of executing steps is properly switched from one step to another. And JPN PAT APPLN KOKAI PUBLICATION NO. 3-14675 discloses in-process vehicle management apparatus by which the number of vehicles in process is grasped on the basis of their specific use so as to utilize it for vehicle management.

Further, Menjyu Satoshi "the level adjustment technique for a planned production target" (The Institute of System Control and Information Engineers) in "95 Dissertations of the Production Scheduling Symposium" (Oct. 2, 1995 in Kyoto) pp 187–192 is directed to uniforming daily quantities of processing at respective steps.

Finally, the production ratio control apparatus disclosed in JPN PAT APPLN KOKOKU PUBLICATION NO. 6-328351 is of such a type that, when, with counters arranged relative to corresponding types, a given type of items starts its production process, one counter corresponding to another type of items is incremented by a proper amount so as to progress the production process at a desired ratio.

In the production ratio control apparatus disclosed in JPN PAT APPLN KOKAI PUBLICATION NOs. 64-34644 and 6-328351, the type of items have their production ratio controlled through the updating of the production sequence data and it is, therefore, not suitable to accurately control the quantity of products for each type of their items.

Further, the method and apparatus as disclosed in JPN PAT APPLN KOKAI PUBLICATION NOs. 2-36037 and 3-14675 are directed to grasping/controlling the product inventory or work and is not suitable to control the production ratio and quantity of their types over a given period of time.

In the technique as described in "the leveling adjustment technique for a production target plan", it is possible to level the quantity of processing at each job step but it is not suitable to control the quantity of the work at each step.

In the apparatus as described in JPN PAT APPLN KOKAI PUBLICATION NO. 6-328351, it is possible to control the processing ratio of the respective types of items, that is, their production ratio, and to accurately control the production quantity. However, it is necessary to, at each start of processing, have the values of counters for the other types varied, that is, have the values of these counters varied one less than the number of types involved, so that, the more the types of items, the more counters have to be varied in a substantially proportional relation.

BRIEF SUMMARY OF THE INVENTION

It is accordingly the object of the present invention to provide a production control apparatus and method which can realize an improvement in a production efficiency as well as in accuracy of a production ratio.

The present invention can count execution numbers at respective steps, allocate a priority order to these steps on the basis of the counted execution numbers, output information on the priority order to a corresponding production machine and, by doing so, properly control the execution numbers.

The present invention can count execution numbers at respective steps, select the highest priority one of these steps on the basis of the counted execution numbers and standby states of standby work at the steps, output information on the selected highest priority step to a corresponding production machine and, by doing so, properly control the execution numbers or specify a priority order step.

The present invention can count execution numbers at respective steps, select the highest priority work on the basis of the counted execution numbers and standby states of standby work at the steps, output a work code corresponding to the selected highest priority order work and, by doing so, properly control the execution numbers or specify the work code corresponding to the highest priority order work.

The present invention can count execution numbers on a per-type/per-step basis, weight the counted execution numbers on the basis of a production ratio inherent in the respective types, allocate a priority order to the steps on the basis of the weighted execution steps, output information on the priority order to a corresponding production machine and, by doing this, properly control the execution numbers or properly control the production ratio.

The present invention can count execution numbers on a per-type/per-step basis, weight the counted execution numbers on the basis of a production ratio inherent in the types, select the highest priority work on the basis of the weighted execution numbers and standby states of standby work at these steps, output information relating to selected priority work to a production machine, and, by doing so, properly control execution numbers or specify the highest priority order step and further to properly control the production ratio.

The present invention can count execution numbers on a per-type/per-step basis, weight the counted execution numbers on the basis of a production ratio inherent in respective types, select the highest priority one of steps on the basis of the weighted execution numbers and standby states of standby work at the respective steps, output a work code corresponding to the selected highest priority order step to a production machine and, by doing so, properly control the execution numbers or specify the work code corresponding to the highest priority step and further properly control the production control.

Additional objects and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a diagrammatic view showing a production control apparatus according to a first embodiment of the present invention;

FIG. 2 is a schematic view showing a production control apparatus in FIG. 1;

FIG. 9 is a schematic view showing a detail of the production control apparatus in FIG. 8;

FIG. 17A is a view showing a data structure of work arrival information;

FIG. 17B is a view showing a data structure of standby information;

FIG. 17C is a view showing a data structure of work arrival information;

FIG. 19 shows an operation flow ranging from the receipt of highest priority information by the production machine to the outputting of the work starting information;

FIG. 20 shows an operation flow for outputting work arrival information;

FIG. 23A is a view showing a data structure of production ratio information;

FIG. 23B is a view showing a data structure of target standby state information;

FIG. 23C is a view showing a data structure of initial value information;

FIG. 23D is a view showing a data structure of operation starting information;

FIG. 23E is a view showing executing step information;

FIG. 23F is a view showing a data structure of execution number information;

FIG. 23G is a view showing a data structure of priority order information;

FIG. 25 shows a latter half flow of initial value calculation processing;

FIGS. 26A to 26D show a time transition of standby numbers relating to one type under priority control by the fourth embodiment;

FIG. 29 is a view for explaining the operation of the production control apparatus when a production control group comprised of a plurality of production machines is to be controlled;

FIG. 30 is a view for explaining the operation of the production control apparatus when a production line including two production machine groups is to be controlled; and FIG. 31 is a diagrammatic view showing a practical form of the production control apparatus of FIG. 30.

DETAILED DESCRIPTION OF THE INVENTION

Figure 3:
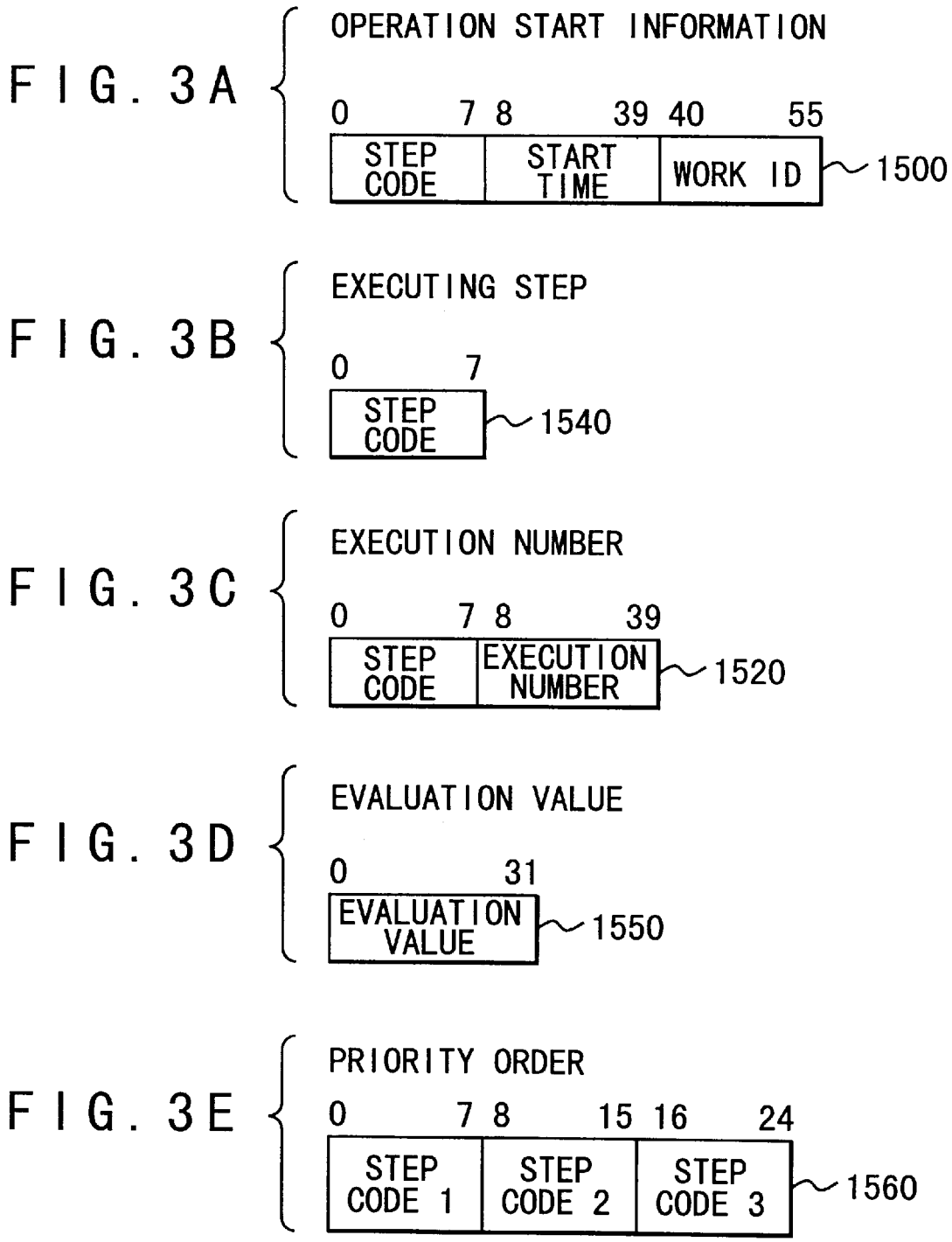
FIG. 3A is a view showing a data structure of operation start information.
FIG. 3B is a view showing a data structure of executing step information.
FIG. 3C is a view showing a data structure of execution number information.
FIG. 3D is a view showing a data structure of evaluation value information.
FIG. 3E is a view showing a data structure of priority order information.

The embodiment of the present invention will be explained below with reference to the accompanying drawings. First, the terms hereinbelow used are defined as follows:

The term "step" is defined to mean one of operation units into which a production process starting with a material and ending with a finished product is divided. That is, a plurality of steps are involved in one production process, noting that a first, a second, a third step, . . . , are involved in accordance with the order of the production line.

The term "work" is defined to mean an intermediate, semi-finished or unfinished product on the production process. Here, the "material" is also intended to mean one form of the work. In order to clarify the relation between the step and the work, it is assumed that the "material" (first status in-process work) is converted by a first step to a second status work which is converted by a second step to a third status work which is converted by a third step to a fourth status work, . . . .

The term "production resource" is primarily intended to mean a production machine actually executing these steps and working the work.

The term "procedure" is intended to mean the procedure done on a computer.

The term "production ratio" is used when a plurality of types of products are manufactured on a mixed basis and is given as a ratio of a production quantity of each type of, products to a total production quantity of all types of products involved. That is, there is a tendency that the reciprocal of the production ratio is increased when a production quantity of the product is relatively small and decreased when the production quantity is relatively large.

The term "execution number" is intended to mean the number of executions at respective steps each work undergoes since the start of the production and the number involved is counted by type and by step.

(First Embodiment)

The production control apparatus according to a first embodiment of the present invention will be explained below. FIG. 1 shows the production control apparatus according to the present embodiment and three production machines M0, M1, M2. The production process starting with a material (A) and ending with a product (F) comprises a first step (P1), a second step (Q1), a third step (P2), a fourth step (Q2) and a fifth step (P3). The material (a first status work) (A) is converted by the first step (P1) to a second status work (B) which is converted by the second step (Q1) to a third status work (C). The third status work (C) is converted by the third step (P2) to a fourth status work (D). The fourth status work (D) is converted by the fourth step (Q2) to a fifth status work (E). The fifth status work (E) is converted by the final, that is, the fifth step (P3) to a product F.

The production machine M0 handles the first step (P1), third step (P2) and fifth step (P3). The production machine M1 handles the second step (Q1) while the production machine M2 handles the fourth step Q2.

For convenience in explanation, here, the production control apparatus controls the first, third and fifth steps (P1), (P2) and (P3) handled by the production machine M0. An explanation will be given below about (1-1) the structure of the whole production control apparatus, (1-2) an inner structure and function of respective constituent elements and (1-3) its whole operation. Then an explanation will be given in a sequential way below about (1-4) how the production control apparatus is used in an actual production site and, finally, (1-5) the effect of the present embodiment.

(1-1) the structure

As shown in FIG. 1, the production control apparatus 1 comprises an "execution number" recording section 200 and priority order calculation section 210. The production machine, upon executing any of the steps (P1), (P2), (P3), delivers operation start information 1500 to the production control apparatus 1. The execution number recording section 200 has the function of recording the execution number information (history information) 1520 on a "per-step" basis and the function of updating the execution number information 1520 in accordance with operation start information 1500 entered, that is, counting the execution numbers on a per-step basis.

The priority order calculation section 210 has the function of receiving a current execution number information 1520 and allocating priority order information 1560 to steps in accordance with the current execution information and function of outputting the priority order information 1560 to the production machine M0.

(1-2) the inner structure and function of the constituent elements

Referring to FIG. 2, an explanation will be given below about the practical structure and function of the production control apparatus 1. The production control apparatus 1 is realized by a computer. A main memory device 300 is shared by an execution number memory section 202 and evaluation value memory section 212. Software 301 stored in an auxiliary memory device of a computer-readable memory medium, such as a ROM, comprises an execution number updating section 201, an execution number reading section 203, an evaluation value calculating section 211 and step in-line section 213.

(Execution number recording section)

The execution number recording section 200 comprises an execution number updating section 201, an execution number storing section 202 and an execution number reading section 203. First, referring to FIGS. 3A to 3C, an explanation will be given below about respective information involved. Operation start information 1500 output from the production machine comprises, as shown in FIG. 3A, a step code for specifying an operation starting step, an operation start time (for example, the number of "seconds" from 0:00 in Jan. 1, 1970 at the World Standard Time to the execution time) and a work ID. It is noted that the step code is described with one byte (0 to 7 bits), the operation start time with four bytes (8 to 9 bits), and the operation ID with two bytes (40 to 55 bits). That is, the operation start information 1500 requires seven bits.

Executing step information 1540 is formed by the execution number updating section 201 on the basis of the operation start information 1500 and passed to an execution number reading section 203 and, as shown in FIG. 3B for instance, constitutes a one-byte step code of the operation start information 1500.

The execution number information 1520 has a set of a one-byte step code and 4-byte execution number as shown in FIG. 3C. The execution number corresponds to a value obtained by counting the number of executions from the start of the production to the present time on the per-step basis. The execution number information 1520 is read out by the execution number reading section 203 and passed to the evaluation value calculating section 211. The capacity necessary to record the execution number information of all the steps is 5 bytes×3 (the number of steps)=15 bytes. According to this embodiment, at the start of the production, the execution number is uniformly initialized to "0".

The address on the execution number memory section 202 correspond to a step code. The address corresponding to the step code stores, therein, the execution number at this step. For example, the address corresponding to a step Pi (i=1 to 3) is given as "c+i" with c as a constant. The execution number information 1520 contains the step code "i". However, the execution number memory section 202 can eliminate the need to store the step code "i" because it is stored in the address corresponding to the step.

An explanation will be given below about the function of the execution number updating section 201 and execution number reading section 203 in the control software 301. The execution number updating section 201, upon receipt of operation start information 1500, calculates the address "c+i" from the step code i in the operation start information 1500 and then increments, by one, the data (execution number) of the calculated address "c+i", by doing so, it is possible to calculate the execution number of the respective step in accordance with the progress of the operation of the production machine. Further, the execution number updating section 201 supplies the executing step information 1540 to the execution number reading section 203 so that it is triggered.

The execution number reading section 203 reads out the execution number information of all the steps which is passed to the priority order calculation section 210.

(Priority order calculation section)

The priority order calculation section 210 comprises the evaluation value calculation section 211, evaluation value memory section 212 and the step in-line section 213. First, an explanation will be given below about the respective information involved. An evaluation value 1550 is found from the respective steps and comprised of four bytes. It is to be noted that, in the first embodiment, the evaluation value is equal to the execution number.

The step in-line section 213 allocates the order of priority to the steps (P1, P2, P3) in accordance with the evaluation values of the steps (P1, P2, P3) and prepares the priority order information 1560 by arranging three step codes in accordance with the order of the priority. Stated in more detail, a higher priority order is imparted to those steps having a lower evaluation, that is, a smaller execution number, while, on the other hand, a lower priority order is imparted to those steps having a higher evaluation, that is, a larger execution number. By doing so, the smaller the execution number to be imparted to the step, the higher priority order it receives. The priority order information 1560 prepared by the step in-line section 213 is comprised of a step code array of three steps (P1, P2, P3) as shown in FIG. 3E and these step codes are arranged in accordance with a given priority order. The priority order information 1560 requires three bytes because the respective step code is comprised of one byte.

The evaluation memory section 212 is provided on the main memory section 300 and stores evaluation values (execution number) 1550 of the three steps. The evaluation value of the step Pi is stored in a "v+i" address (four-byte long) where v denotes a constant. The evaluation value 1550 is stored as four bytes in the evaluation value memory section 212 at an address inherent in the step code (i).

Then an explanation will be given below about the evaluation value calculation section 211 and step in-line section 213 in the control software 301. The evaluation value calculation section 211 holds an evaluation function 1010. The evaluation value calculation section 211 finds the address "v+i" inherent in the step code i upon receipt of the execution number information 1520 from the execution number memory section 200. Then, execution number of the execution number information 1520 is given to the evaluation function 1010. The evaluation value 1550 is calculated and it is stored in the "v+i" address. In the first embodiment, the evaluation value 1550 is equal to the execution number, so that, as the evaluation function, it will be possible to obtain the "evaluation value"=the "execution number". At this time, another in-line trigger 1530 is sent to the step in-line section 213.

The step in-line section 213 has the function of outputting the priority order information 1560. The step in-line section 213 reads out the evaluation values of the three steps (P1, P2, P3) from the evaluation value memory section 212 upon receipt of said another in-line trigger 1530 from the evaluation value calculation section 211 and arranges the three step codes in an increasing order of the evaluation values, that is, in an increasing order of the execution numbers. And the step in-line section 213 outputs the priority order information 1560 to the production machine M0.

(1-3) operation

Figure 4:
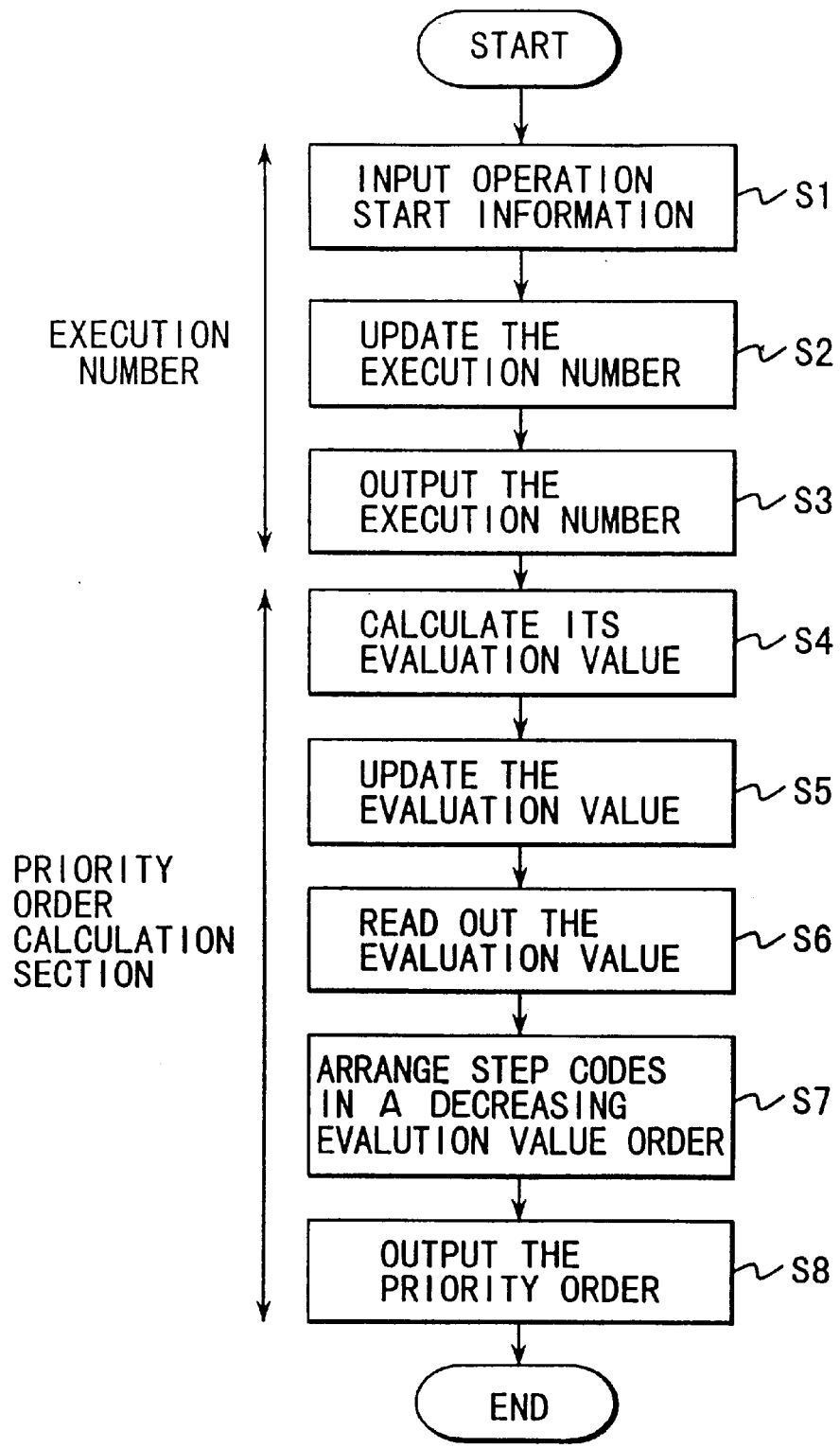
FIG. 4 is a flow chart showing an operation flow under production control.

An explanation will be given below about the operation of the production control apparatus 1 by referring to the flow chart shown in FIG. 4.

Step S1: When any of the three steps (P1, P2, P3) is executed, the production machine M0 supplies operation start information 1500, containing its step code, work start time and work ID, to the execution number updating section 201.

Step S2: The execution number updating section 201 prepares an address from the step code in the operation start information 1500 and increments by "1" the data stored in the address, that is, the execution number of the corresponding step. By doing so, the execution numbers are counted on a per-step basis.

Step S3: The execution number reading section 203 reads out the execution number corresponding to the three steps (P1, P2, P3) from the execution number memory section 202 and sends it as execution number information 1520 to the priority order calculation section 210.

Step S4: The evaluation value calculation section 211 receives the execution number information 1520 and calculates evaluation values from the respective execution numbers relative to the steps (P1, P2, P3). In the present embodiment, the evaluation value is equal to the execution number.

Step S5: The evaluation value calculation section 211 updates the evaluation value 1550, which is stored in the evaluation value memory section 212, to an evaluation value calculated at step S4.

Step S6: The step in-line section 213 reads out the evaluation values of three steps (P1, P2, P3) from the evaluation value memory section 212.

Step S7: The step in-line section 213 arranges the step codes of the three steps (P1, P2, P3) in an evaluation value decreasing order, that is, in an increasing order of the execution number, and prepares the priority order information.

Step S8: The step in-line section 213 outputs the priority order information prepared by step S7 to the production machine M0.

It is to be noted that the value of the execution number stored in the execution number memory section 202 will become a very large value if the production operation is continued over an extended time of period and involve a risk of producing an overflow. In order to prevent this occurrence, it is necessary to, in place of adopting any non-effective procedure of simply increasing the number of bits, take more effective prevention measures. For example, in order that a minimal value of the three execution numbers may become "0" in an available time, a procedure called a "counter resetting", that is, the procedure of subtracting, from the execution numbers of the respective steps, minimal one of these execution numbers, is taken.

Since such counter resetting is to be done, all the contents of the execution number memory section 202 are changed and it is, therefore, necessary to also reflect this state in the evaluation value memory section 212. For this reason, the step codes of the operation start information 1500 are sequentially changed from P1 to P3 and the procedure of steps S2 to S5 is carried out.

(1-4) the detailed explanation about the application of the production control apparatus to control the production machines Now an explanation will be given below about how the production apparatus M0 in the production line is production-controlled by the production control apparatus 1.

(A structure of the production line)

FIG. 1 shows how the production machine M0 produces a product (F) from a material (A) under the cooperation of other production machines M1, M2 in the production line. The process of producing the product (F) from the material (A) includes five steps P1, Q1, P2, Q2, P3. Of these, the steps P1, P2, P3 are done by the production machine M0; step Q1, by the production machine M1; and step Q2 by the production machine M2.

1. The production machine M0 executes the operation of step P1, processes the first status work, that is, the material (A), to provide the second status work (B) and passes it to the production machine M1.
2. The production machine M1 executes the operation of step Q1, processes the second status work (B) to provide the third status work (C) and passes it back to the production machine M0.
3. The production machine M0 executes the operation of step P2 and processes the third status work (C) to provide the fourth status work (D) and passes it to the production machine M2.
4. The production machine M2 executes the operation of step Q2 and process the fourth status work to provide the fifth status (E) work and passes it back to the production machine.
5. The production machine M0 executes the work of step P3 and process the fifth status work to provide the product (F).

This process is characterized in that the production machine M0 handles the operation of three steps as a single machine. The production control apparatus 1 of the first embodiment indicates in what order these steps should be done on the production machine M0 handling these steps. This is dynamically repeated each time the production machine starts the operation of one step.

(Status of the production control apparatus)

Figure 5:
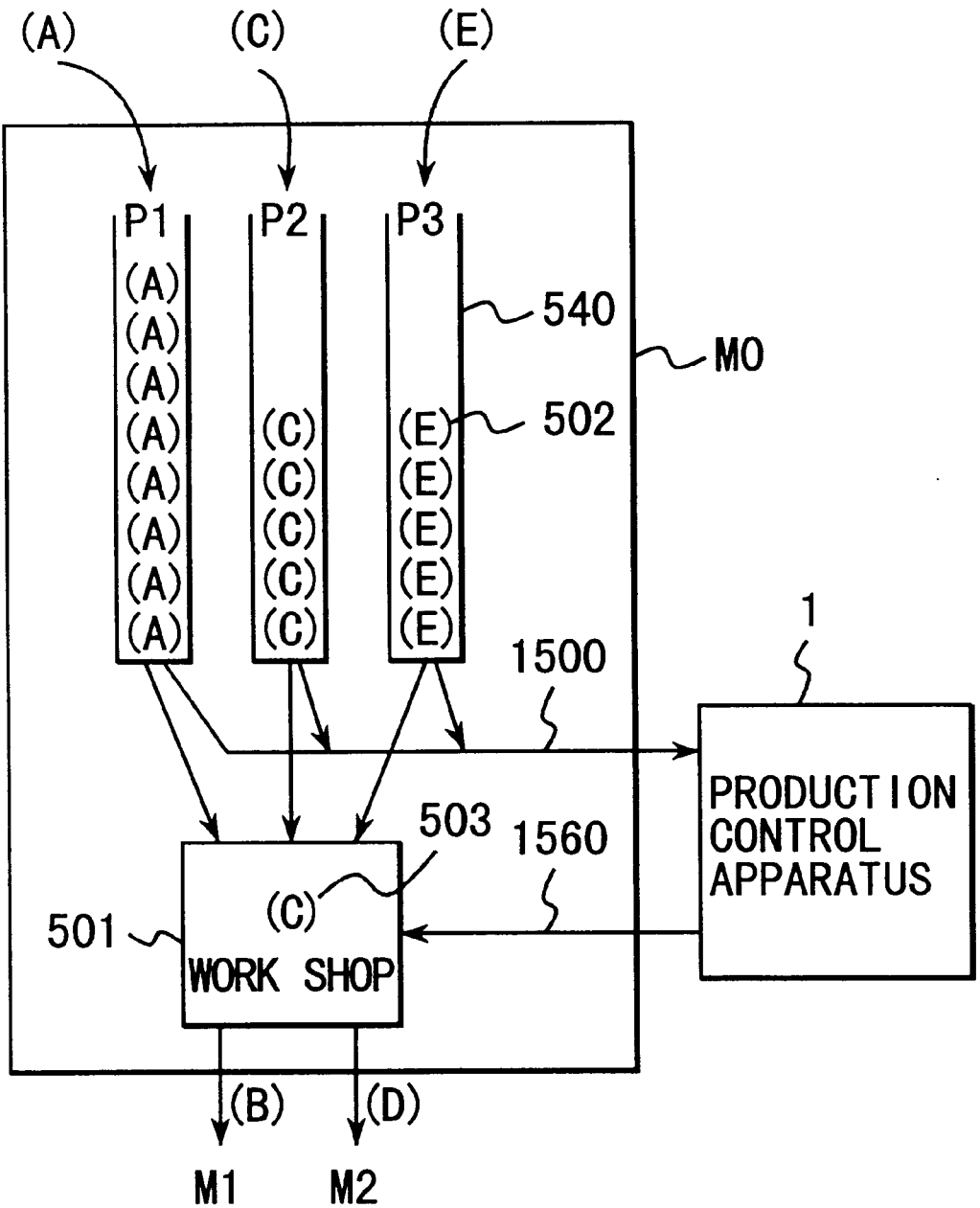
FIG. 5 is a schematic view showing a first production machine.

FIG. 5 shows a schematic model of the production machine M0. Now assume that the second status work (C) is being processed, that is, the third step (P2) is done, at a work shop 501 of the production machine M0 and that three kinds of works 502, i.e., the first status work (A), third status work (C) and fifth status work (E), are in a standby state in a standby area of the production machine M0 so as to undergo the corresponding step.

The production control apparatus 1 outputs the priority order information 1560 to the production machine M0. The production machine M0 selects whether or not the first, third and fifth status works (A), (C) and (E) are in a standby state, that is, are there any standby works to be processed by the first, third and fifth step, and selects the step to be next executed on the basis of a given priority order. That is, the production apparatus M0 selects, out of these stand-by works, a highest priority step.

When the work is actually started, the operation start information 1500 is output from the production machine M0 to the production control apparatus 1. The production control apparatus 1 updates the execution number information 1520, prepares the priority order information 1560 and outputs it before the operation of the step involved is completed. By doing so, the production machine M0 can complete the operation of the step involved, without waiting for the priority order information 1500, and start the operation of the next step.

(The method of the production machine's selecting the step)

Figure 6:
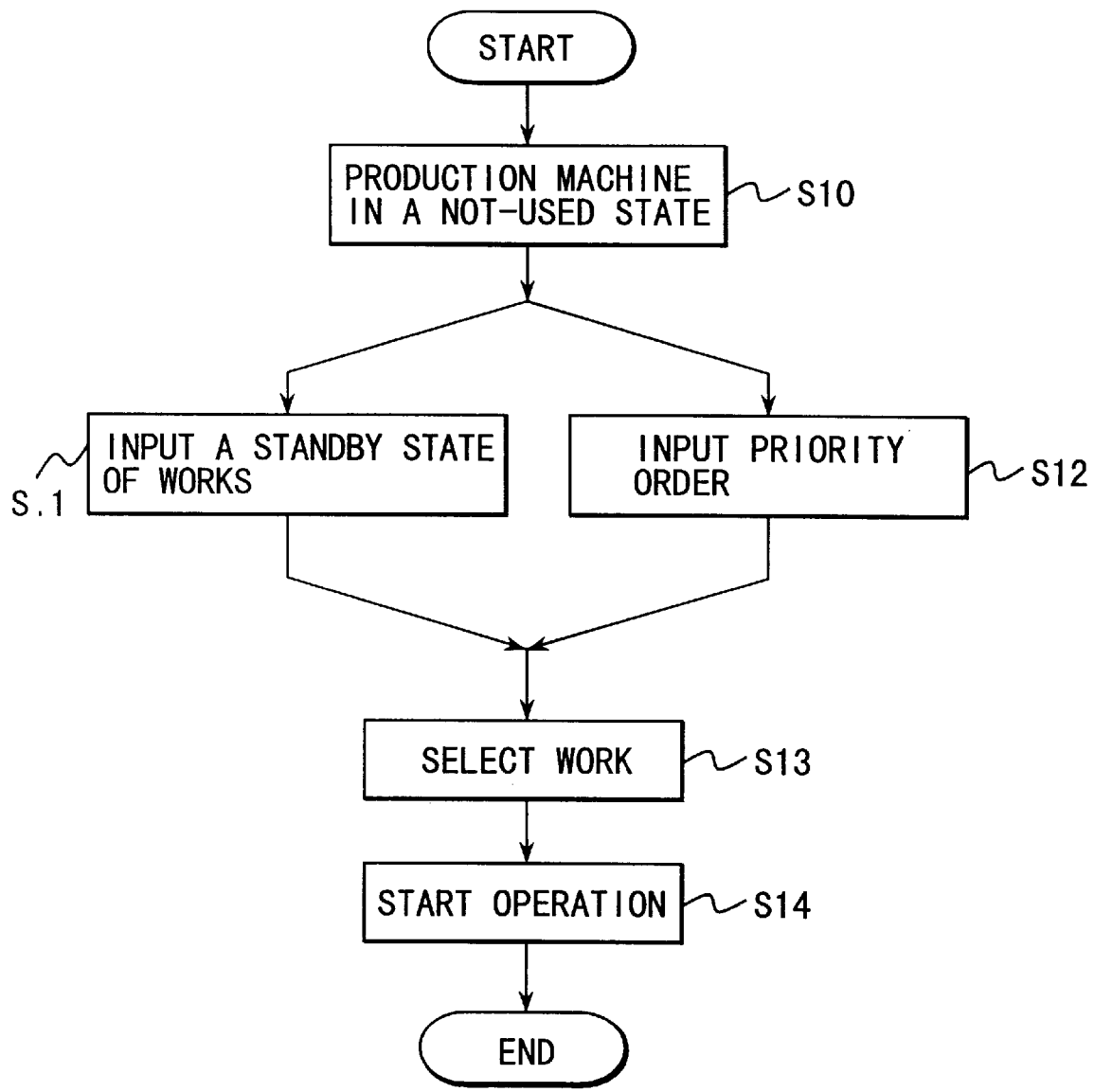
FIG. 6 is a view showing an operation flow of the production machine.

With reference to the operation flow in FIG. 6, an explanation will be given below about the method for selecting the next step to be executed by the production machine M0 on the basis of the priority order information 1560 sent from the production control apparatus 1.

Step S10: At the completion of the step involved, the production machine M0 is placed in an available state and, in this state, the production machine M0 executes the procedure of the next step S11 or S12.

Step S11: Checking is made to see whether or not there is any work 502 in a standby state.

Step S12: The priority order information 1500 from the production control apparatus 100 is decoded. It is to be noted that step S11 and step S12 are not in a priority order, that is, each step can be executed after the other step or both can be executed in a parallel relation.

Step S13: Of those having at least one work in a standby state, the highest priority order step, that is, the lowest execution number step, is selected.

Step S14: The work to be processed by the selected step is transferred from the standby area 540 to the working area.

In step S13, when two or more steps of the same priority exist, one step may be freely selected out of these and, since the execution number information is updated by executing the selected step, this time one of the not selected step is selected.

By executing the lower execution number step first, the execution numbers of the respective steps (P1, P2, P3) are gradually increased, so that the standby numbers of the third and fifth status works reserve their initial states.

(Detailed procedure)

With reference to FIGS. 7A to 7D, an explanation will be given below about the execution numbers and movement of the standby numbers of the work. In these Figures, reference characters of the works (A), (C), (E) represent the order of inputs to the production line. For convenience in explanation, an explanation will be given below about manufacturing a product from the material at the three steps P1, P2, P3 handled by the production machine M0, while disregarding steps Q1, Q2 of the production machines M1, M2 here. Further, it is assumed that when a plurality of steps have the same execution number and their priority order is the same in these steps, a step having the highest number of works is first executed.

Figures 7A, 7B, 7C, 7D:
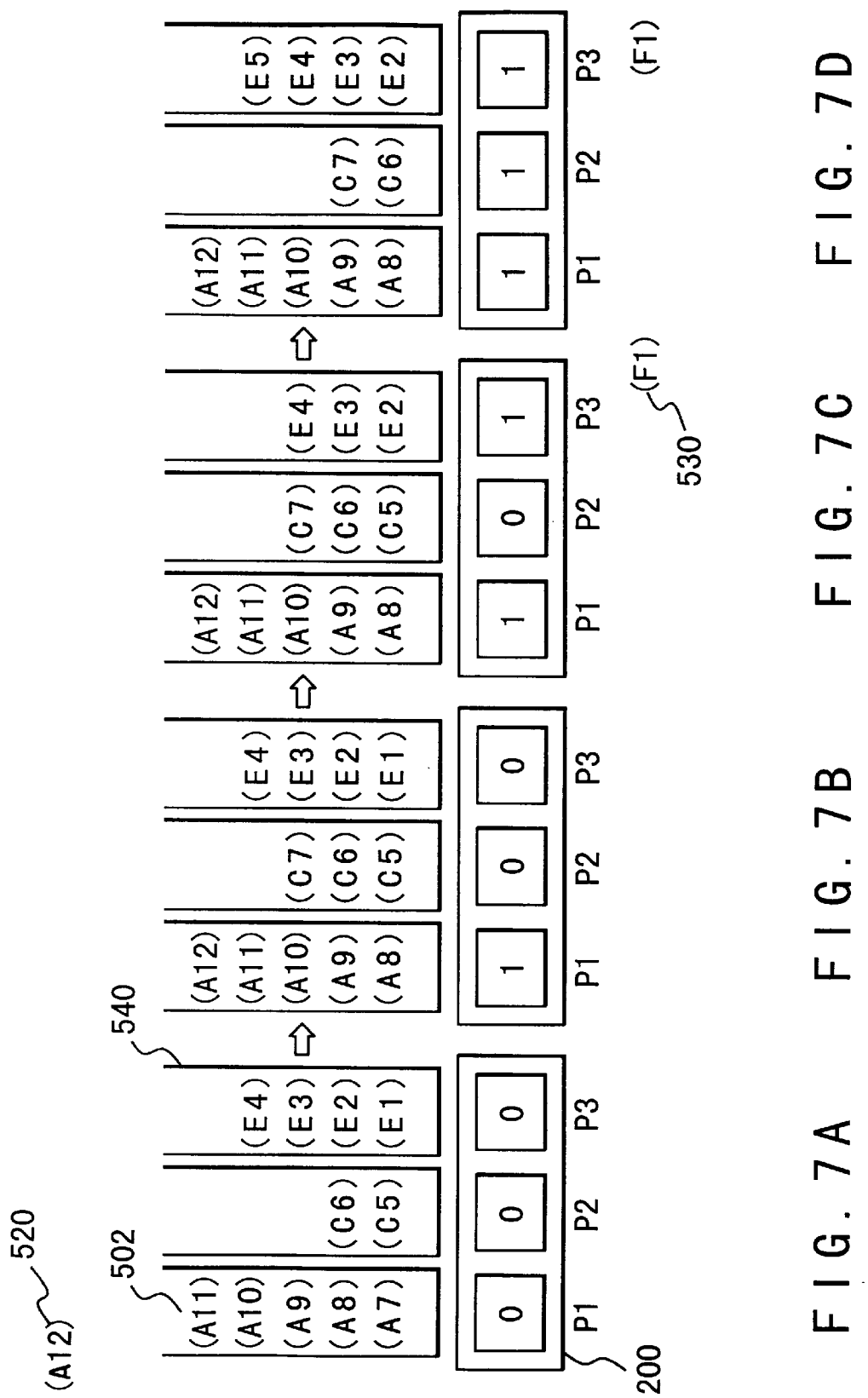
FIGS. 7A to 7D, each, show a time transition on the execution number, as well as standby numbers of work in the standby state, under control of the first embodiment.

FIG. 7A shows an initial state. The execution numbers of the execution number recording section 200 are all reset to "0". In this initial step, the respective steps have the same priority value and the step P1 having the highest standby number of works is first executed.

By the execution of step P1, a first status work (A) is converted to a third status work (C7). The state after the completion of step P1 is as shown in FIG. 7B. The execution number of step P1 is incremented from "0" to "1" in the execution number memory section 200 as shown in FIG. 7B. It is to be noted that, after the completion of step P1, a new first status work (A12) is input to the production line.

After the completion of step P1, the execution number of step P2 is "0", that is, equal to the execution number of step P3. The priority order of step P2 is "1", that is, is higher than the priority order "2" of step P1 and equal to that of step P3. Those works (E) in a standby state for the operation done by step P3 is four, a number greater than that of the works in a standby state for the operation to be executed at step P2, so that the operation of step P3 is next executed.

The state taken after step P3 is as shown in FIG. 7C. At step P3, the fifth status work (E1) is converted to a product (F1) and the execution number of step P3 on the execution number recording section 200 is incremented from "0" to "1".

At the completion of step P3, the execution number of step P2 is "0", a number smaller than those of the other steps, so that the highest priority order is allocated to step P2. And the operation of step P2 is executed. The state taken at step P2 is as shown in FIG. 7D.

At step P2, the third status work (C5) is converted to the fifth status work (E5). The execution number of step P2 is incremented from "0" to "1" on the execution number recording section 200. As a result, the execution numbers of all the steps are made equal since their initial states, the standby number of the third status works (C) is returned back to the initial standby number "2" and the standby number of the fifth status works (E) is returned back to the initial standby number "4".

In the explanation above, a simple rule is obeyed under which step execution is done from one of those steps of the equal priority order which has the highest number of works. So long as any high order priority rule is obeyed under which a step of the highest priority order is decided in accordance with the number of execution steps involved, the state of FIG. 7D is finally reached.

(1-5) the effect

As set out above, according to the first embodiment, the execution numbers of respective steps go toward a uniform number with the progress of the production operation as shown in FIGS. 7A and 7D, so that it is possible to prevent the standby number of works from being largely deviated from the equal number.

(Second Embodiment)

An explanation will now be given below about the second embodiment. Here, an explanation is focused on the portions of the second embodiment which are different from those of the first embodiment.

(2-1) the structure

Figure 8:
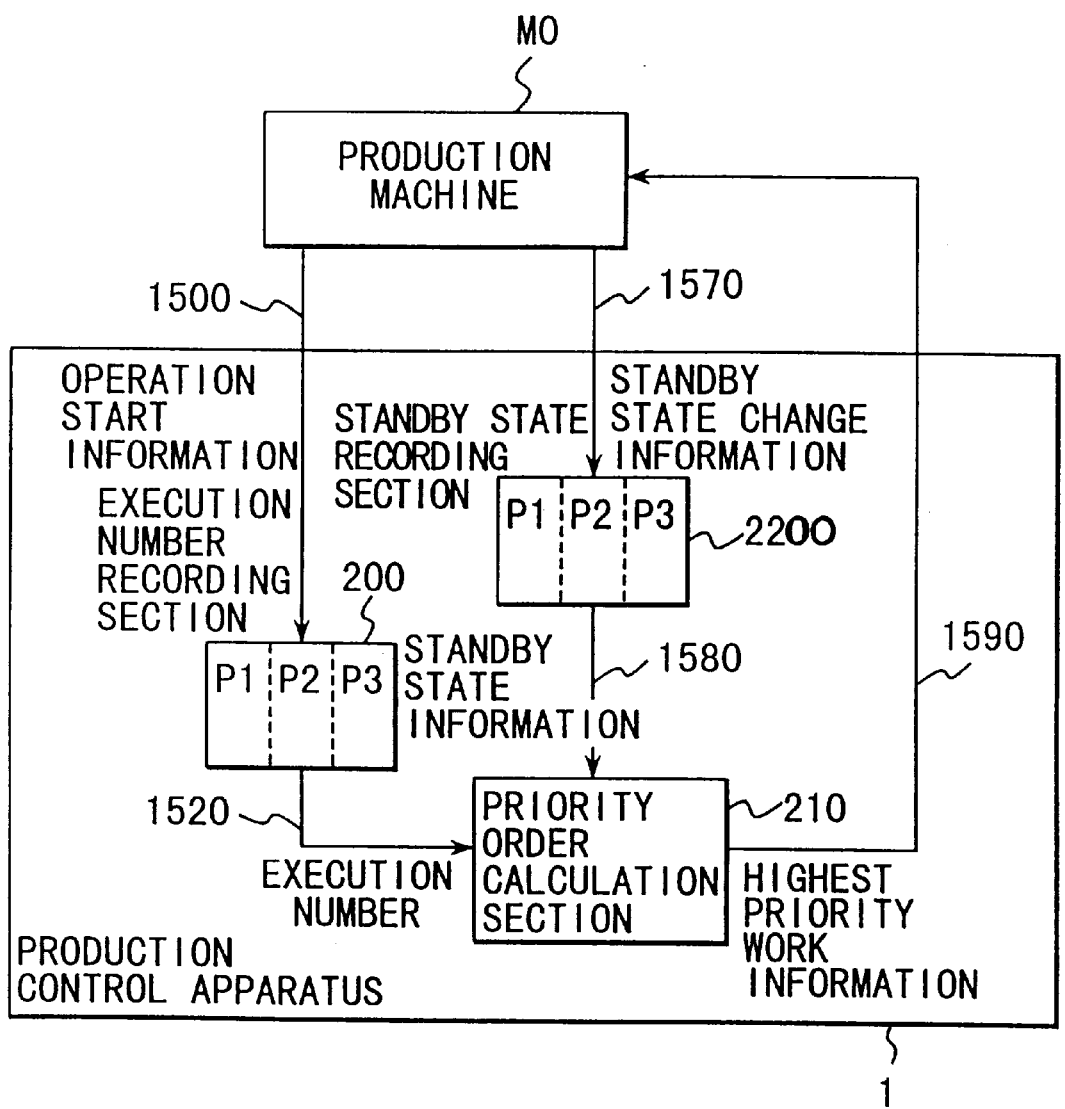
FIG. 8 is a schematic view showing a production control apparatus according to a second embodiment of the present invention.

FIG. 8 shows the structure of a production control apparatus according to a second embodiment of the present invention. In FIG. 8, the production control apparatus 1 comprises an execution number memory section 2000, a priority order calculation section 2100 and a standby state recording section 2200 and is characterized in that, in comparison with the first embodiment, the second embodiment includes, as an additional constituent, the standby state recording section 2200. The execution number recording section 2000 has the same function as that of the first embodiment of the present invention. The standby state recording section 2200 serves to record standby state information 1580 representing the standby state of works per step. Upon receipt of standby state change information 1570 from a production machine M0 as a result of a variation in standby state of the works, the standby state recording section 2200 updates standby state information 1580.

The priority order calculation section 2100 has the same process up to the calculation of the priority order information 1560 as in the first embodiment, but is different therefrom in that, on the basis of the calculated priority order information 1560 and standby state information 1580 output from the standby state recording section 2200, a step to be executed with the highest priority is selected with a production device M0 and the work ID specifying a work corresponding to the selected step is output as the highest priority information 1590.

(2-2) the structure and operation of respective constituent elements

The structure and operation of the production control apparatus 1 in FIG. 8 will be explained below in more detail with reference to FIG. 9. The execution number recording section 2000 is the same in function as the first embodiment and an explanation of this constituent element is omitted for brevity's sake.

(Standby state recording section)

Figure 10A:
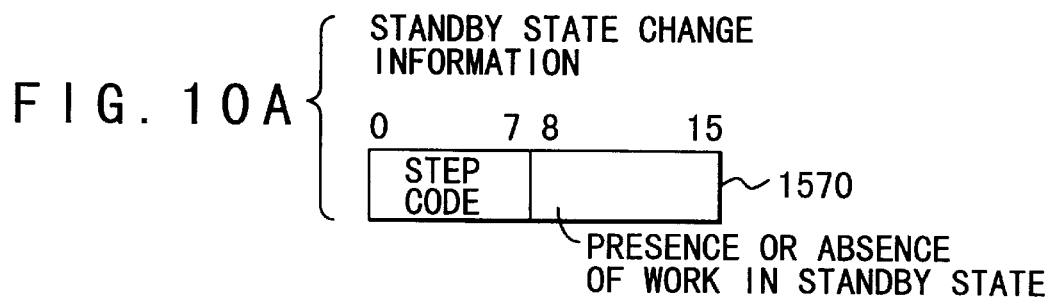
FIG. 10A is a view showing a data structure of standby state change information.
Figure 10B:
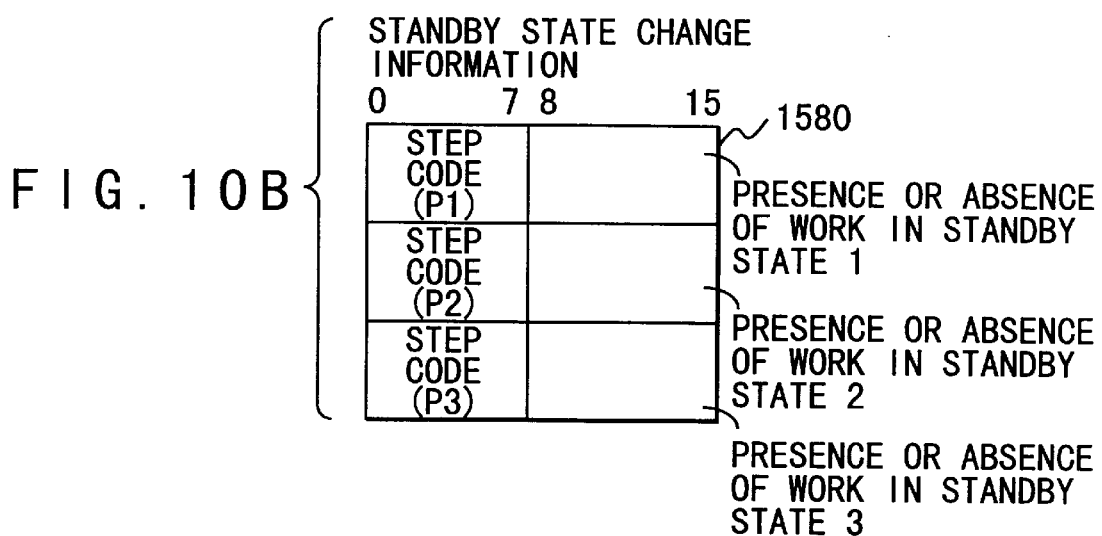
FIG. 10B is a view showing a data structure of standby state information.
Figure 10C:
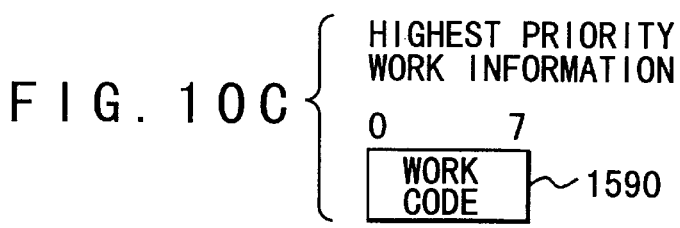
FIG. 10C is a view showing a data structure of highest priority work information.

The standby state recording section 2200 comprises a standby information updating section 221, a standby information recording section 222 and a standby information reading section 223. With reference to FIGS. 10A to 10C an explanation will be given below about the data structure of respective information. Standby state change information 1570 is output from the production machine M0 to the standby information updating section 221 when the standby state of the works, that is, the presence or absence of the standby work, changes. Standby state change information 1570 is comprised of, as shown in FIG. 10A, step code information of one byte and presence/absence information of one byte for instance. The standby state information is updated at any time, by the standby information updating section 221 in accordance with the standby state change information 1570. The presence or absence of the works in the standby state is represented actually by one bit (1: a presence, 0: absence) of the lowest order and the upper seven bits are "0" at all times.

The standby state information 1580 comprises, as shown in FIG. 10B, step code information and presence/absence information of the works in the standby state. Since, in this case, two bytes are allocated per step, it is necessary to provide six bytes in all. The standby state information 1580 is output from the standby information reading section 223 to a step selection section 214 of the priority order calculation section 2100.

The standby information memory section 222 is placed in a main memory section 300 and stores the standby information. The standby presence/absence information relating to step Pi is stored at a "Pti" address where P denotes a constant. The standby state information 1580 contains the step code "i" and is recorded in the standby information memory section 222 at an address fixed to the step. The respective address contains four-byte memory area and, since actual information is comprised of one bit, the lowest order bit alone is padded, for example, with "0".

An explanation will be given about the function of the standby information updating section 221 and standby information reading section 223 in a control software 301. Upon receipt of standby state change information 1570, the standby state updating section 221 finds, from the step code "i" of the standby state change information 1570, the "p+i", that is, an address inherent in a step corresponding to the standby state change of works from the "presence" to "absence" or the "absence" to the "presence". Then the lowest order bit of the "p+i" address is updated and an information updating trigger 1530 is sent to the standby information reading section 223.

Upon receipt of the trigger from the standby information updating section 221, the standby information reading section 223 reads out the standby information of the three steps from the standby information memory section 222 and decodes it. A constant p is subtracted from the respective address value "p+i" to reproduce a step code "i" and prepare standby state information 1580 with the step code and standby state as a set.

(Priority order calculation section)

The priority order calculation section 2100 includes a highest priority step selecting section 214 in addition to an evaluation value calculation section 211, evaluation value memory section 212 and step in-line section 213. In the previous embodiment, the process up to the preparation of the priority order information is done by the production control apparatus. The second embodiment specifies the step for actually executing the production machine M0 with the highest priority and, further, outputs the code corresponding to the highest priority step to the production machine M0 as the highest priority information 1590. The highest priority information 1590 is comprised of a work code of one byte as shown in FIG. 10C.

An explanation will be given below about the highest priority step selection section 214 in the control software 301. The step in-line section 213 outputs the priority order information 1560 to the highest order step selection section 214.

Figure 11:
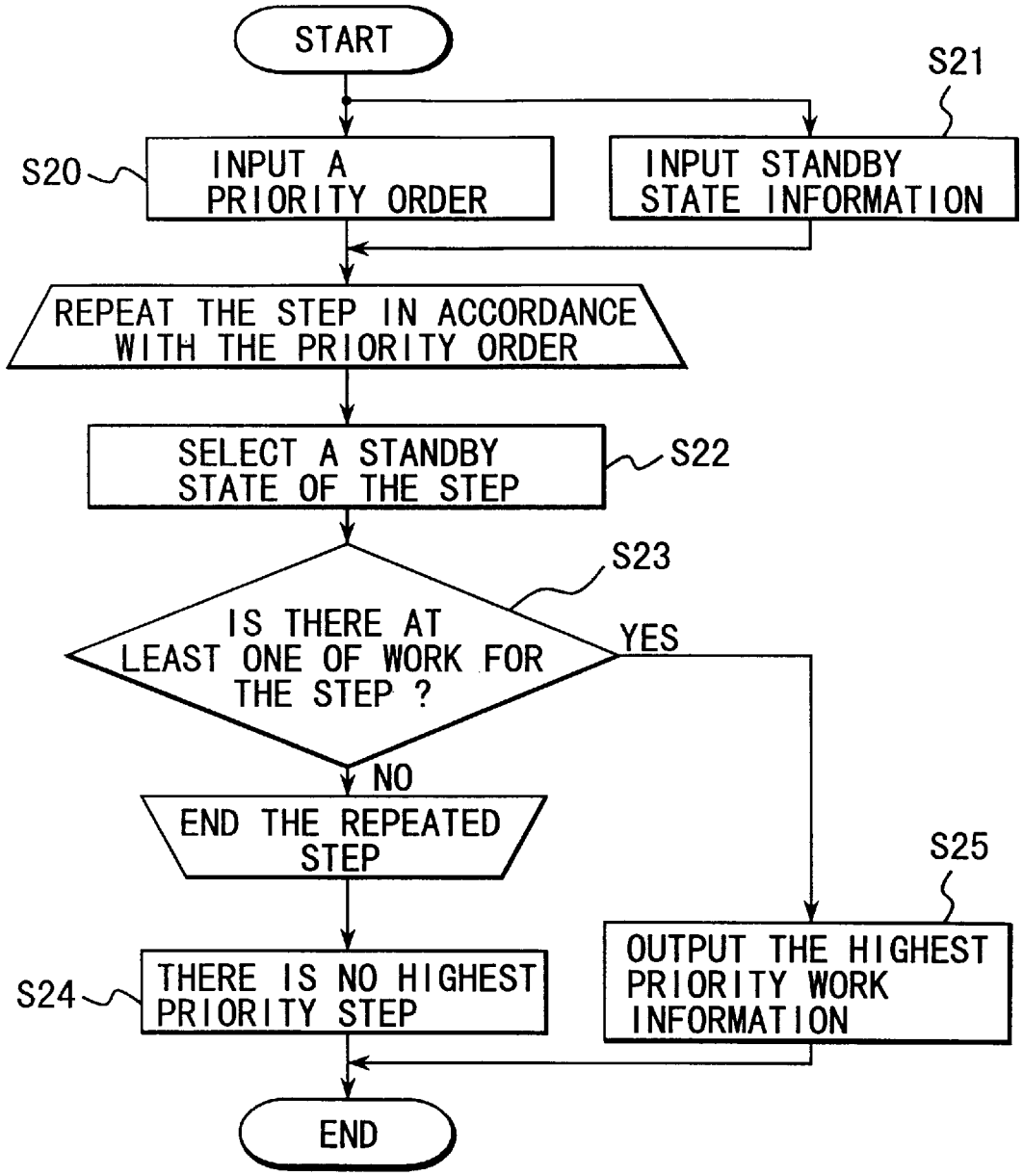
FIG. 11 is a view showing an operation flow of a step selection section.

With reference to the flow chart in FIG. 11, an explanation will be given below about the highest priority step selection section 214. First, the highest priority step selection section 214 performs the next two procedures (step S20, Step S21). These procedures may be performed separately with one being done before the other or in a parallel way.

Step S20: The priority order information 1560 is received as an input from the step in-line section 213 (priority order input).

Step S21: The standby state information 1580 is received as an input from the standby state recording section 2200 (standby information input).

Steps S22 to S23: The procedures are sequentially performed in a priority order decreasing of these steps. That is, Step S22: The standby information corresponding to the given step is selected.

Step S23: From the standby information, checking is made to see whether or not there are any works in a standby state. If YES, step S25 is executed and, if NO, the priority order is checked on the following step.

If there are no works in the standby state as a result of completing these steps S22 and S23 in connection with the full process, control goes to step S24.

Step S24: Since the full process cannot be done, a "0" is produced.

Step S25: There are works in the standby state at steps S22 and S23 and a work corresponding to the highest priority order step code is output as the highest priority work information 1590 to the production machine M0.

Figure 12:
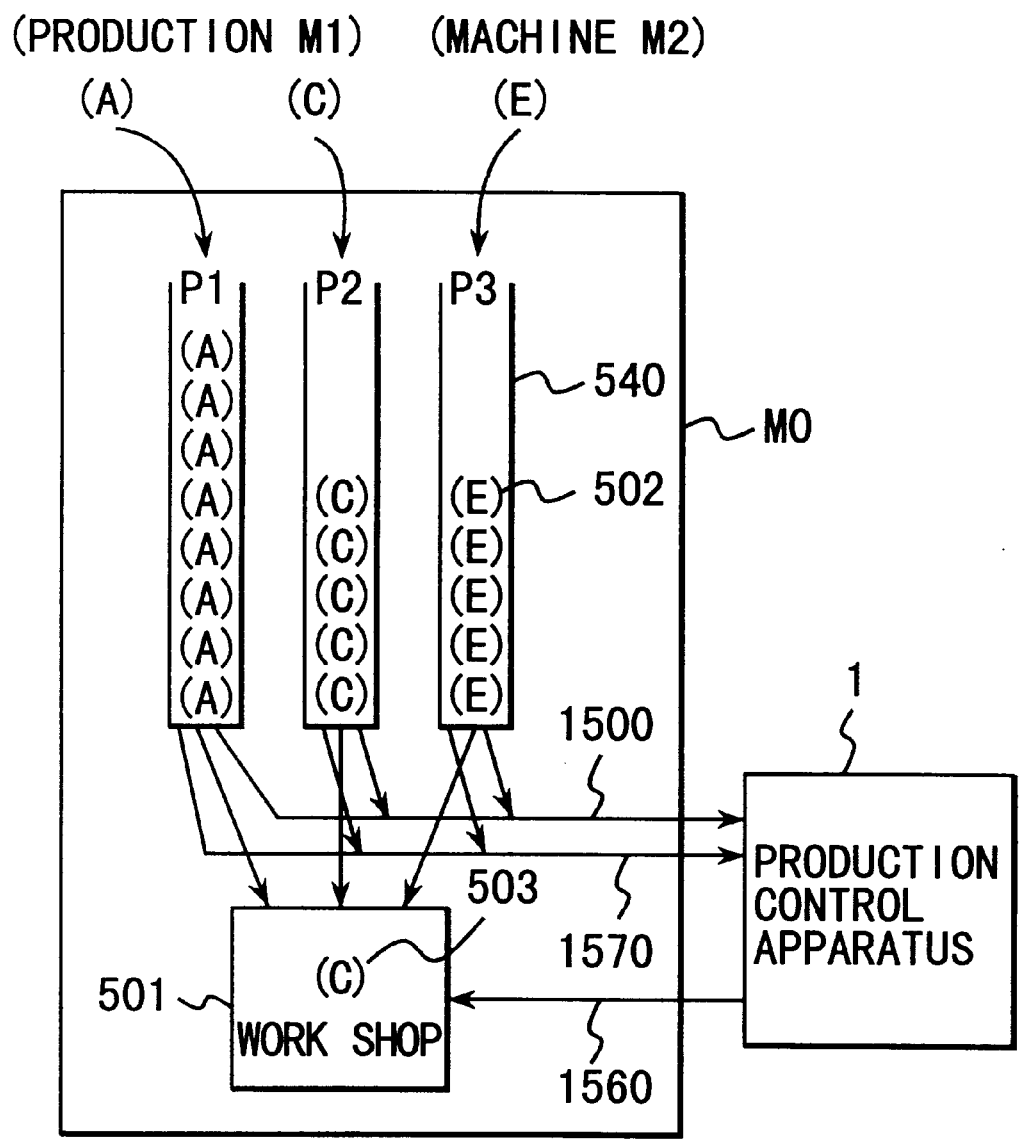
FIG. 12 is a schematic view showing a production machine.

(2-3) An explanation will be given below about how the production control apparatus 1 effects control on the production machine M0 in a production line as set out in connection with the first embodiment (see the explanation of (1-4)). FIG. 12 is a view showing a diagrammatic arrangement of the production machine M0. This arrangement is different from that of FIG. 5 in that (1) the standby state change information 1570 is sent from a standby area 540 to the production control apparatus 1 and (2) the information sent from the production control apparatus 1 to the production machine M0 work start information 1590 specifying the highest priority work, not the priority order.

Figure 13:
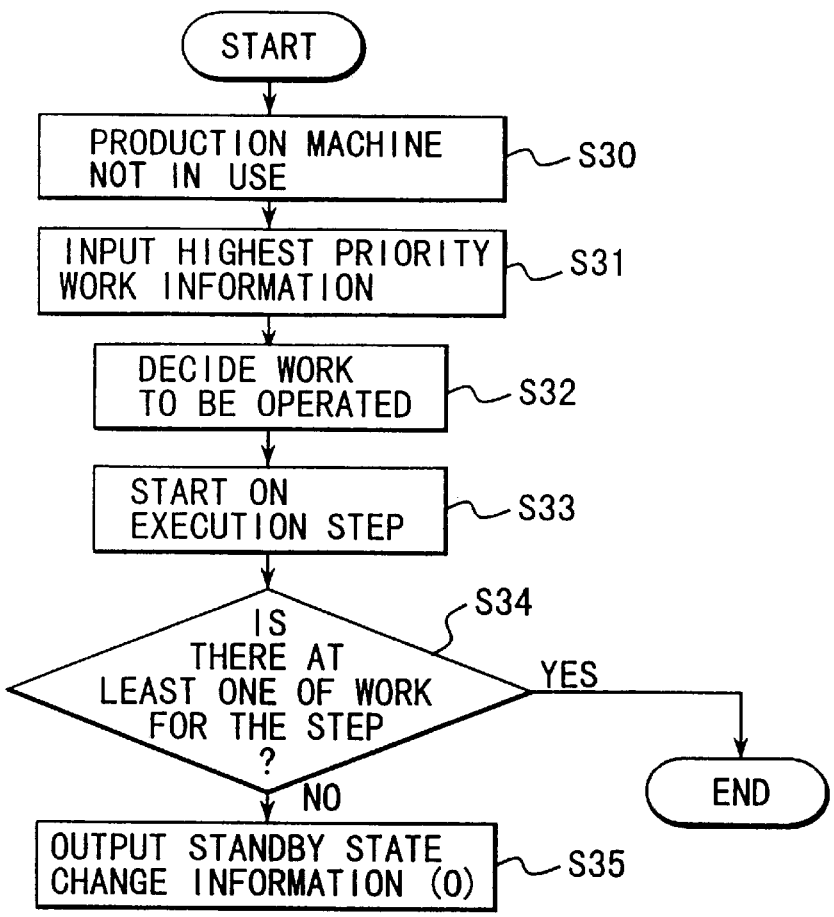
FIG. 13 is a view showing an operation flow of the operation machine to which the highest priority work information is input from the production machine.

With reference to the flow chart as shown in FIG. 13, an explanation will be given below about the operation of the production control apparatus 1.

Step S30: After a given step is ended, the production machine M0 is placed in an available state for the next step to be done.

Step S31: The production machine M0 receives the highest priority step information 1590 from the production control apparatus 1.

Step S32: A work of the longest standby time is selected from among those standby works at the standby area 540.

Step S33: The work shown in the highest priority work information 1590 is processed work.

Step S34: Checking is made to see whether or not there exists at least one standby work at step S33 executed. If YES, that is, there is no standby state change in comparison with the previous state, the flow is ended and, if there is no single work in the standby state, that is, there is a standby state change relative to the state previous to the execution of the step S33, control goes to step S35.

Step S35: The standby state change information representing no presence of the work in the standby state is output to the production control apparatus.

Figure 14:
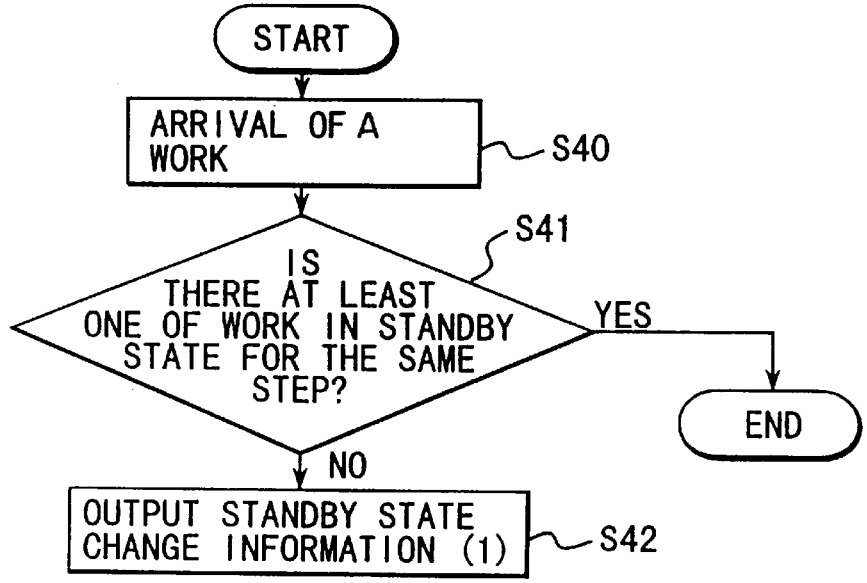
FIG. 14 is a view showing an operation flow of the operation machine involving an arrival of a work.

With reference to FIG. 14, an explanation will be given below about the operation of the production machine M0 when a work arrives at the standby area.

Step S40: The work arrives at the standby area (arrival of the work).

Step S41: When a standby state changes at the arrival of the work, that is, there is no single standby work before the arrival of that work, control goes to step S42.

Step S42: The standby state change information representing the presence of the work in the standby state is output to the production control apparatus.

(2-4) effects

As set out above, in addition to the effect achieved by the first embodiment, the second embodiment also eliminates the need to finally select the step to be next effected by the production machine.

(Third Embodiment)

An explanation will be given below about the third embodiment of the present embodiment. Here, an explanation will be given below about those portions different from the first and second embodiments of the present invention.

(3-1) the structure

Figure 15:
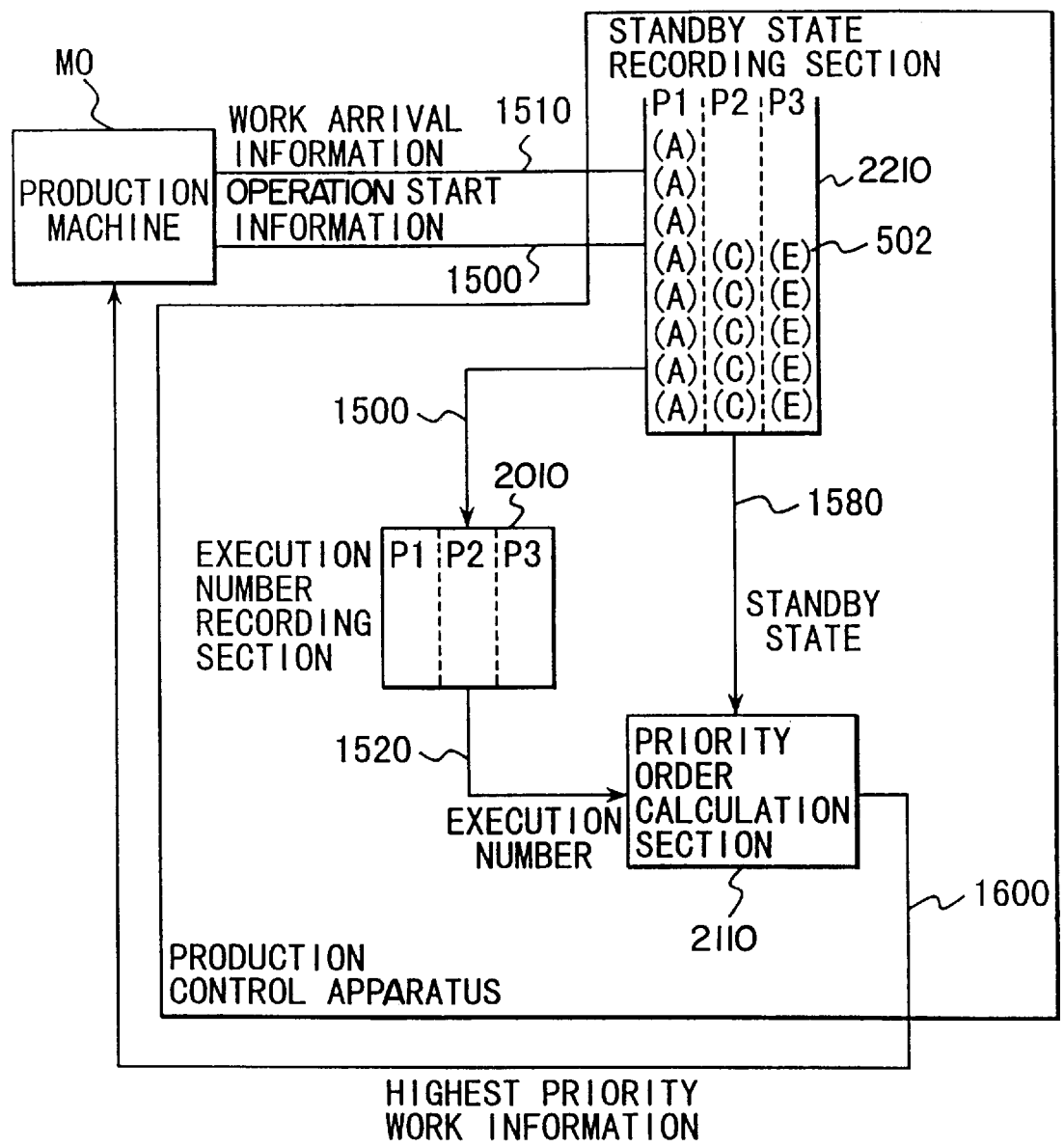
FIG. 15 is a schematic view showing a production control apparatus according to a third embodiment.

FIG. 15 shows the structure of a production control apparatus 1 according to the third embodiment of the present invention. Although the production control apparatus 1 as shown in FIG. 15 comprises the same constituent elements as those of the second embodiment, a standby state recording section 2210 differs primarily in that it can record more detailed standby state information than the presence/absence of the works in the standby state, that is, the standby number of the works per step, and check the detailed standby state information in the selection of the highest priority step.

An execution number recording section 2010 has the same function as that in the first and second embodiments.

A production machine M0 outputs arrival information 1510 to a standby state recording section 2210 when a work 502 arrives at a standby area 540. The product machine M0 outputs operation start information 1500 to the standby state recording section 2210 when processing is started on the work 502 transferred to a work shop from the standby area 220. The standby state recording section 2210 updates the standby state information upon receipt of the arrival information 1510 and operation start information 1500.

The standby state recording section 2210 reads the operation start information 1500 onto an execution number recording section 2010 and the standby state information 1580 onto a priority order calculation section 2110. The priority order calculation section 2110 calculates a step of the highest priority with the standby state of the works checked relative to the execution number.

(3-2) the structure and operation of the respective constituent elements

Figure 16:
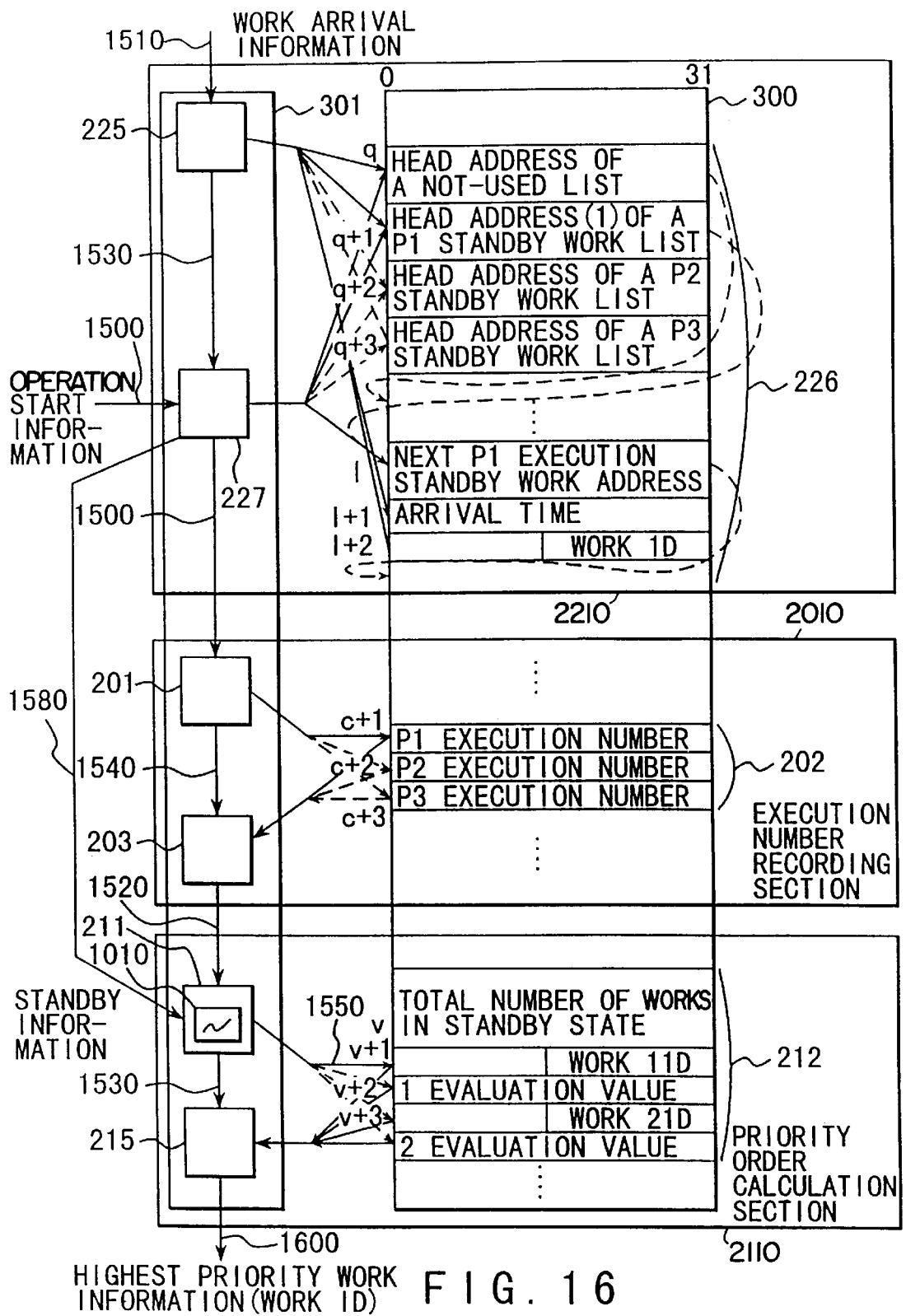
FIG. 16 is a schematic view showing a detail of the production control apparatus in FIG. 5.

With reference to FIG. 16, an explanation will be given below about the detailed structure and operation of the production control apparatus 1 of FIG. 15. Since the execution number recording section 2010 has the same function as that of the first embodiment, any further explanation of it is omitted.

(Standby state recording section)

A standby state recording section 2210 comprises an updating section 225, memory section 226 and reading section 227. Arrival information 1510 is output from the production machine M0 to the updating section 225 each time a material or a work arrives at a standby area of the production machine M0. As shown in FIG. 17A, the arrival information 1510 is comprised of seven-byte information in total, that is, a one-byte step code for specifying a step for processing the material or work, four-byte arrival time-of-day represented by seconds passed from 0:00 in Jan. 1, 1970 (World Standard Time) and two-byte work ID for specifying the work.

The standby state information 1580 arranges the standby number of works, per step, at the standby area of the production machine M0 on the basis of the arrival information 1510 and operation start information 1500 coming from the production machine M0. As shown in FIG. 17B, the standby state information 1580 has its respective step information fixed in length, for example, a four-byte header and eight-byte data per work. The header is comprised of a two-byte "step code" and two-byte "standby number". The "standby number" represents the standby number of works relating to a step involved and coincides with the number of operations. The number of works can be grasped with a work ID of the operation start information.

A memory section 226 is placed in a main memory 300 and stores the arrival times of the works, in link-list format, on a first-come-first-served basis. The head address of the list of works in step Pi is stored in a "q+i" address (four-byte-long) and the address of a not-used list element, that is, an available list, is stored in the "q" address (q=constant).

In FIG. 16, the head address of the list of step P1 is "1" where the address of the memory area of the next work is stored (if there is no next work at the operation end of each step, a "0" is stored as a not-real address). The arrival time is stored in a continued "1+1" address and the work ID is stored in a "1+2" address.

Next, an explanation will be given below about the updating section 225 and reading section 227 in control software 301.

The updating section 225 finds the "q+i" from the step code i upon receipt of the arrival information 1510 and, upon checking the "q+i" address of the memory section 226, knows the head address of a list corresponding to the step. Then it finds a trial end by following the list. The updating section knows the head address of the available list from the "q" address, takes it from the available list, links it to the trail of the list of step P1 starting with the "q+i", stores the arrival time of the arrival information 1510 and work ID and outputs an information updating trigger 1530 to the reading section 227.

The reading section 227 starts its operation upon receipt of the operation start information 1500 and an information updating trigger 1530. Since, in the case of the latter, the same procedure as in the latter half portion of the former is done, an explanation will be given mainly on the start operation by the former.

Upon receipt of the operation start information 1500, the reading section 227 finds the "q+i", as in the case where the updating section 225 is started by the arrival information 1510, and finds an element coinciding with the work ID while following a corresponding list, etc., and separates this element. Further, it follows any available list from the "q" address and links the separated element to the trail of the list. The subsequent procedure is also common to the case of the starting operation by the information updating trigger 1530 of the latter. It follows the list of the works from the "q+i", collects the data of the work data and finds the standby number of works. This procedure, being arranged with respect to all the steps, provides the standby state information 1580 and is output to the priority order calculation section 2110.

And the operation start information 1500 is supplied as it is to the execution number recording section 2010.

(Priority order calculation section)

The present embodiment is different in structure from the first embodiment in that the step in-line section 213 in the priority order calculation section 2110 is replaced with a highest priority step selection step 215. Further, it also is different in function from the first embodiment in that (1) the evaluation value is calculated per work and so recorded and (2) the evaluation value calculation section 211 calculates the evaluation value on the basis of the execution number 1520 and standby state information 1580. Now an explanation will be given below about the differences.

Based on the execution time and standby time, the evaluation value calculation section 211 calculates an evaluation value, at each work, in accordance with an evaluation function 1010. The evaluation value calculation section 211 receives an execution number ($n_{proc}$) 1520 from the execution number recording section 2010 as well as the arrival time (tarr) of the work and present time (t). It is to be noted that the time is given as second units in this case. The evaluation value calculation section 211 calculates an evaluation value fv in accordance with the following evaluation function fv.

$$fv = 3600 \times n_{proc} - (t - tarr)$$

That is, the evaluation value becomes higher, the greater the execution time and the longer the standby time. And one execution number is evaluated as being equivalent to the standby time of one hour. Stated in another way, even if the step is lower in the priority order from the standpoint of the execution number, its priority order is made higher in the case where there is work having a very long standby time.

The evaluation value memory section 212 records, in the head ("v" address), the total number (standby number) of works, work ID and evaluation value.

A highest priority step selection section 215 selects a step of the lowest evaluation value as the highest priority step and, as shown in FIG. 17C, outputs a work ID specifying the work corresponding to the selected step, as the highest priority work information 1600 to the production machine M0.

Figure 18:
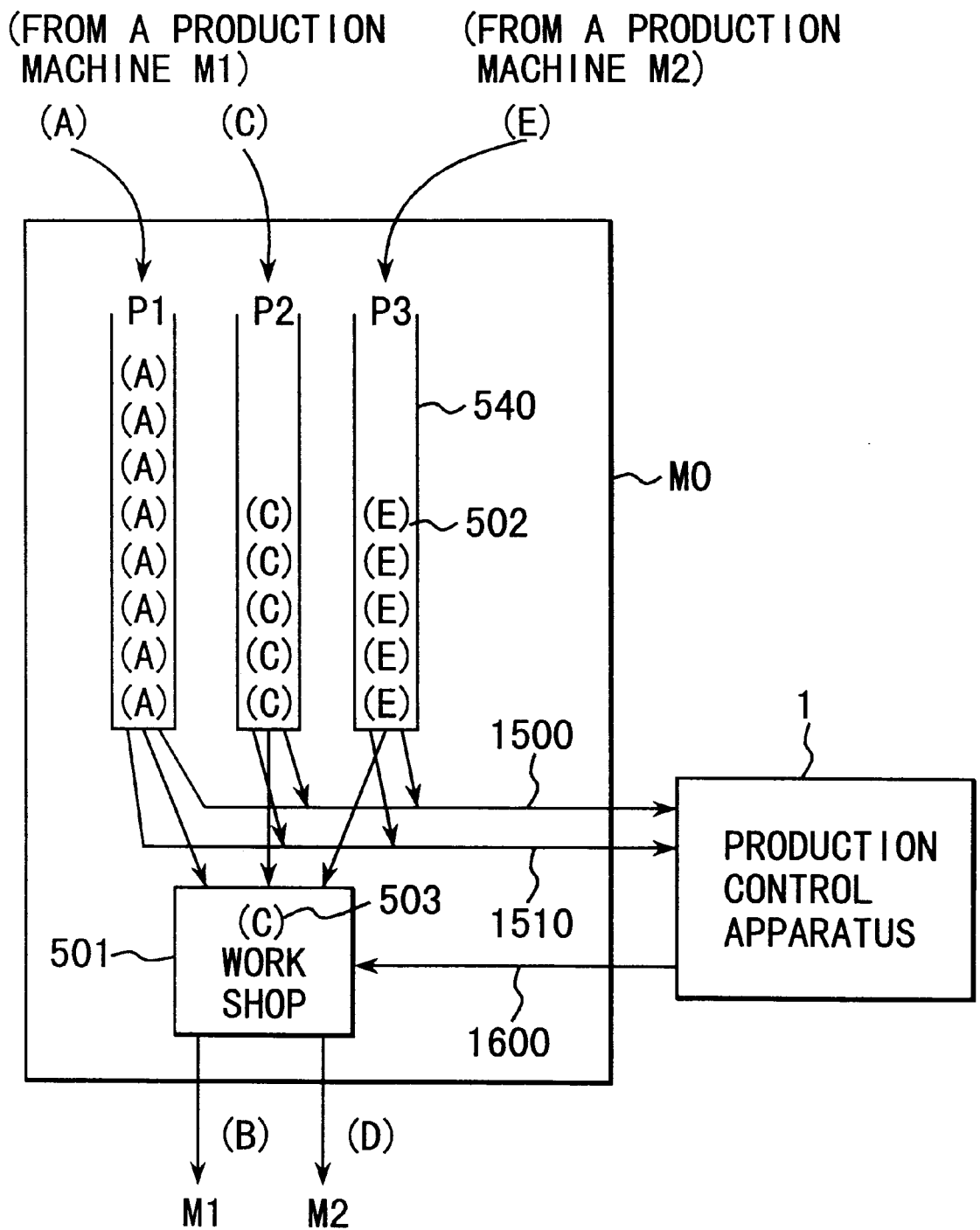
FIG. 18 is a schematic view showing a production machine.

(3-3) the detailed explanation on the use of the production control apparatus for the control of the production machine An explanation will be given below about the difference between the present embodiment and the second embodiment. FIG. 18 shows a major structure of the production machine M0 so as to explain how the production control apparatus 1 controls the production machine M0 as an object of control in the same production line as set out in connection with the first embodiment (see the explanation of (1-4)). The difference from FIG. 12 is in that (1) the arrival information 1510, not the standby state change information 1570, is sent from the standby area 1510 of the production machine M0 to the production control apparatus 1 and (2) the information sent from the production control apparatus 1 to the production machine M0 is not the priority order but the highest priority work information 1600 containing the work ID specifying the work corresponding to the highest priority step.

With reference to the flow chart in FIG. 19, an explanation will be given below about how a work to be next processed by the production machine M0 is selected based on the highest priority step information 1600. In FIG. 18 is shown the state of processing by the production machine M0 on a work 503.

Step S50: When the processing is finished on the corresponding work 503, the production machine M0 is placed in an available state in which the next step can be executed on the production machine M0.

Step S51: The production machine M0 receives the highest priority work information from the production control apparatus 1.

Step S52: The production machine M0 processes a work specified by the highest priority work information.

Step S53: The operation start information containing a step code, operation start time (present time) and work ID is output to the production control apparatus 1.

The operation of the production machine M0 when a work arrives at a standby area of any of three steps of the production machine M0 will be explained below with reference to a flow chart shown in FIG. 20.

Step S60: The work arrives at the standby area of the production machine M0.

Step S61: The production machine M0 outputs the arrival information containing the step code, arrival time (present time) and work ID to the production control apparatus.

(3-4) the effect

As explained above, according to the third embodiment, a detailed standby state of the work containing the standby number and standby time is recorded in the standby state recording section 2210 and the priority order calculation section 2110 selects a step to be executed with the highest priority with not only the execution number of the respective steps but also the standby time added thereto. In this selection, it is possible to change the weight of the execution number and execution time by varying the multiplication constant of the execution number.

(Fourth Embodiment)

An explanation will be given below about the fourth embodiment of the present invention. Here, an explanation will be given mainly of parts of the fourth embodiment which are different from those of the first embodiment.

(4-1) the structure

Figure 21:
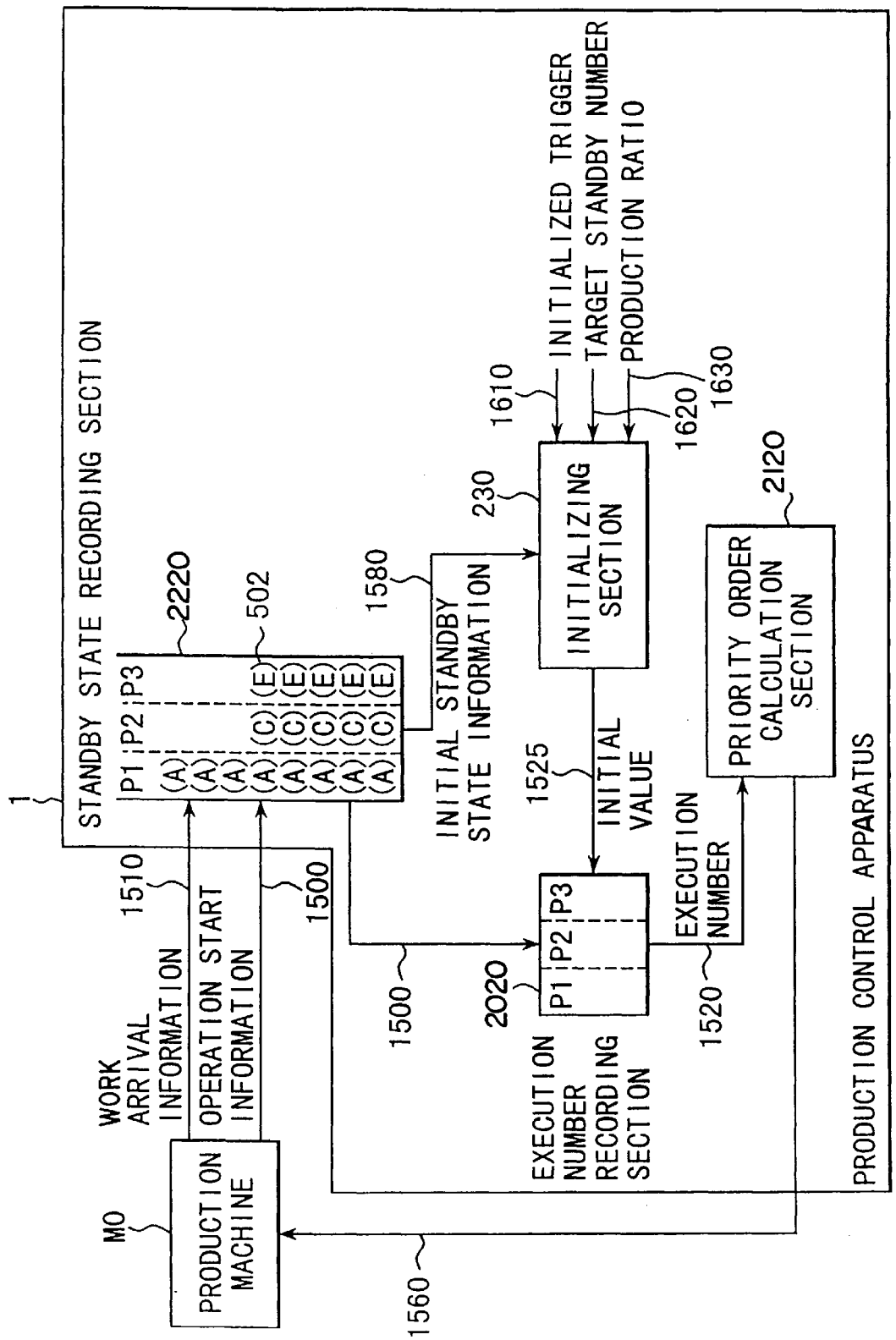
FIG. 21 is a schematic view showing a production control apparatus according to a fourth embodiment of the present invention.

FIG. 21 shows the structure of a production control apparatus according to a fourth embodiment of the present invention. In FIG. 21, the production control apparatus according to the fourth embodiment comprises an execution number recording section 2020, a priority order calculation section 2120, a standby state recording section 2220 having the same function as that of the third embodiment, and an initializing section 230. In the first embodiment the execution number is counted after the count values are reset, whereas the fourth embodiment of the present invention is characterized in that a proper initial value is imparted, on a per-type/per-step basis, by the initializing section 230, an increment is done from this initial value and the execution number is counted and the counted execution number is weighted with a production ratio.

In the production control apparatus of the first embodiment, the production machine or production line for manufacturing one kind of product is used as a target and various data have to be identified both by step and by type. For this reason, use is made of a type/step code (two bytes) of a combination of the step code (one byte) and type code (one byte). The execution number of the type/step Pi is stored in the "c+i" address and the evaluation value in the "v+i" address.

Except in the above-mentioned points, the priority order calculation section 2120 performs the same function as in the first embodiment and the standby state memory section 2220 the same as in the third embodiment. And the corresponding explanation is, therefore, omitted.

Upon receipt of an initializing trigger 1610 input by the user from a console of the production control apparatus 1 before the start of the production machine, the initializing section 230 has standby state information 1580 (representing the standby number of works on a per-type/per-step basis), production ratio information 1630 and target standby state information 1620 read thereon, calculates an initial value 1525 of a count value at a time of counting the execution number and outputs it to the execution number recording section 2020.

The execution number recording section 2020 has, in addition to the counting function as set out in connection with the first embodiment, the function of resetting count values to initial values from the initializing section 230, weighting the counted execution number with the production ratio 1630 corresponding to the type and recording the weighted execution number.

(4-2) the structure and operation of the constituent elements

Figure 22:
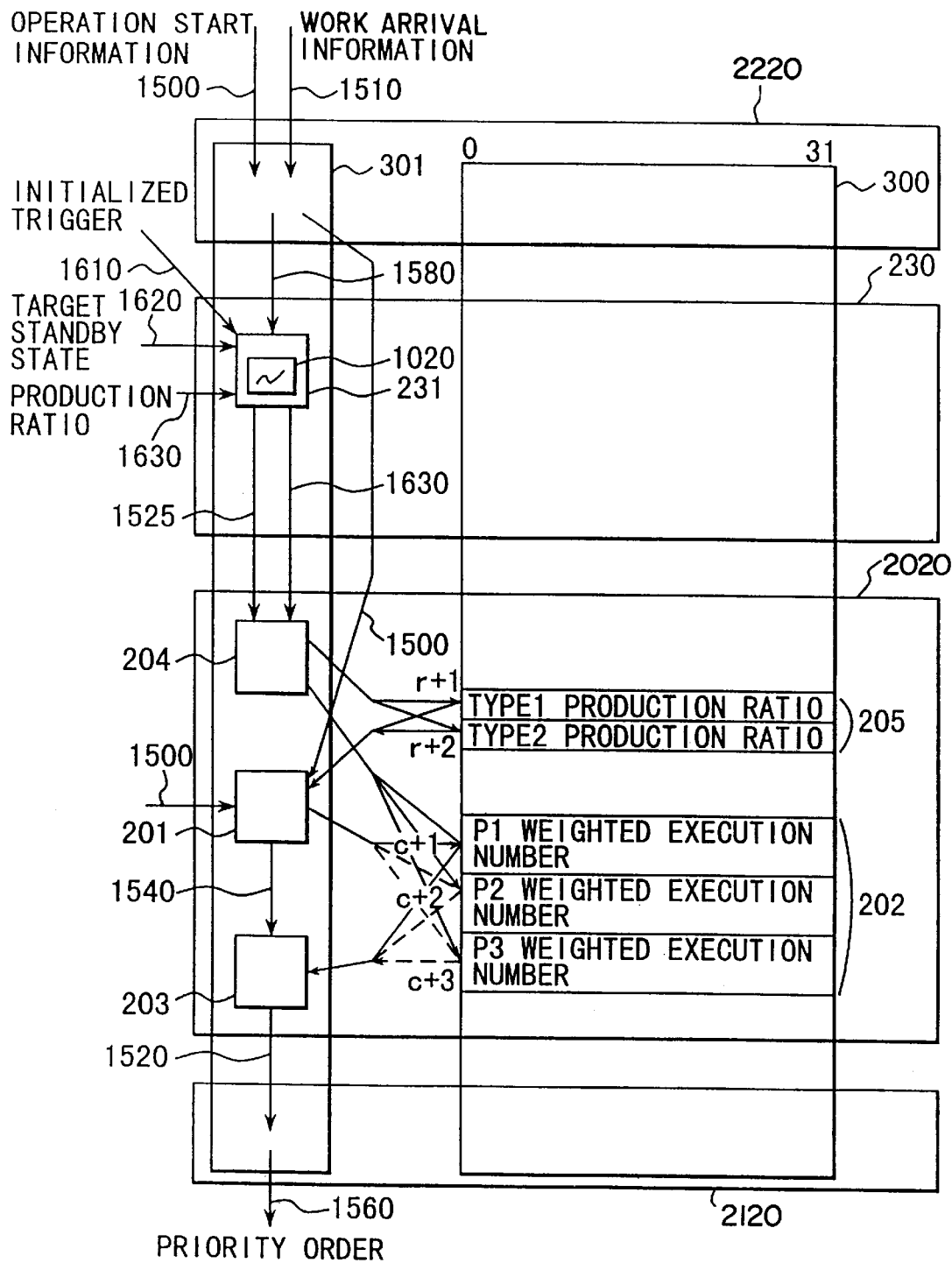
FIG. 22 is a schematic view showing a detail of the production control apparatus in FIG. 21.

With reference to FIG. 22 an explanation will be given below about the detailed structure and operation of the initializing section 230 and execution number recording section 2020.

(Initializing section)

The initializing section 230 is comprised of an initial value calculation section 231. The production ratio information 1630 is comprised of, as shown in FIG. 23A, sets of a four byte production ratio and two byte "type" code.

The target standby state 1620 is comprised of, as shown in FIG. 23B, sets of a target value (target standby number) of per-type/per-step works in a standby state and type/step code for specifying the type and step.

The initial value 1525 is comprised of, as shown in FIG. 23C, a four-byte initial value and two byte type/step code.

Operation start information 1500, executing step information 1540, execution number information 1520 and priority order information 1560 are different from those of the first embodiment in that, as shown in FIGS. 23D to 23G, the type/step code is used in place of the step code.

An explanation will be given below about the function of the initial value calculation section 231 constituting a portion of control software 301. The initial value calculation section 231 is started, for example, upon receipt of an initializing trigger 1610 input by the operation of the user, has a standby state (representing an initial standby state), the target standby state information 1620 (for example, initially set by the user and reserved in memory), and production ratio information 1630 read therein, calculates the initial value, on a per-type/per-step fashion, based on these and sent to the execution number recording section 2020.

Figure 24:
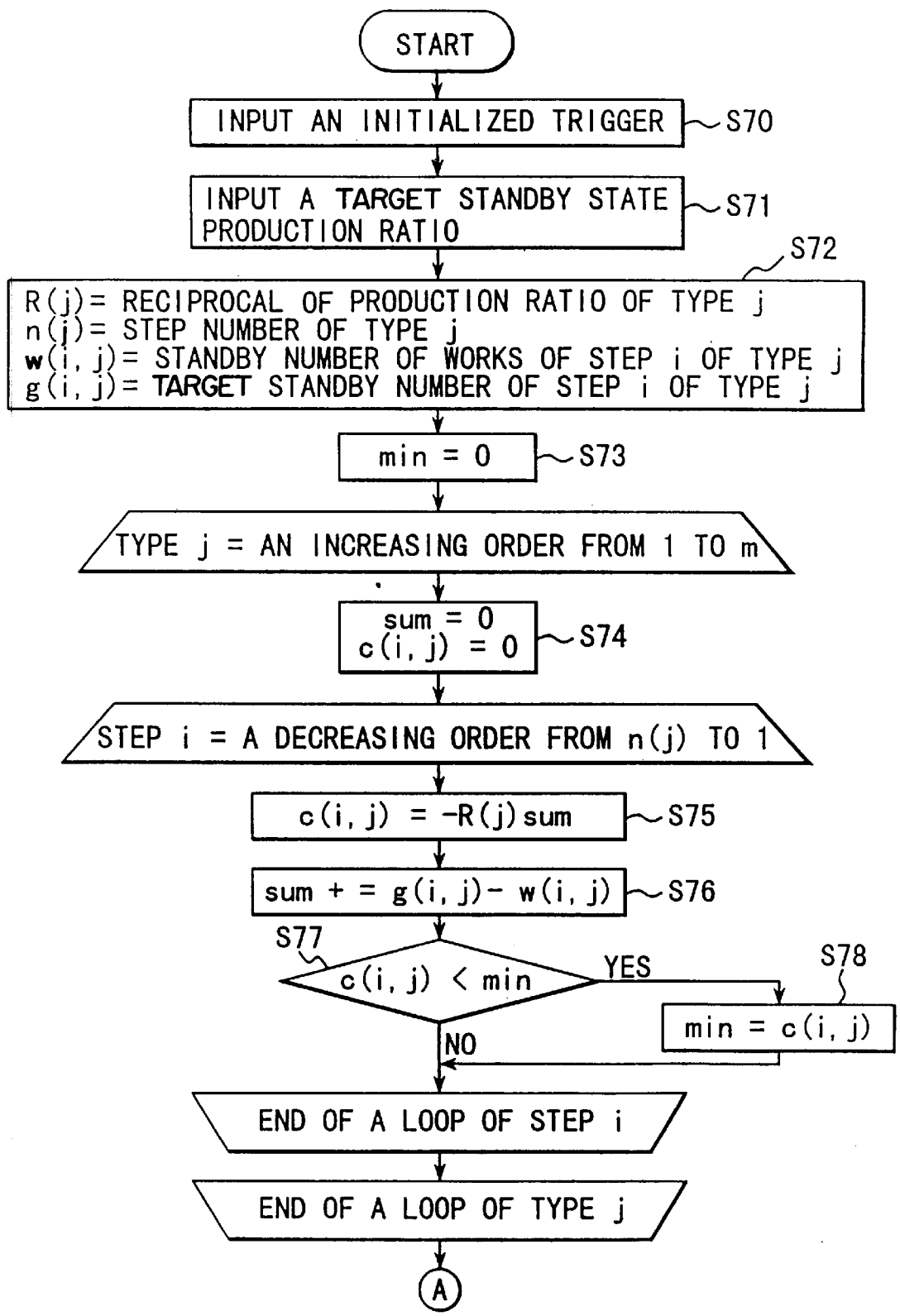
FIG. 24 shows a first half flow of initial value calculation processing.

The flow chart as shown in FIGS. 24 and 25 shows the operation of the initial value calculation section 231.

Step S70: The initial trigger 1610 is input.

Step S71: The production ratio 1630, target standby state 1620 and initial standby state are input.

Step S72: Variables are decided as follows:

The production ratio of a type j is assigned into R(j).

The step number of the type j is assigned into n(j).

The standby numbers of the type j and step i are assigned into w(i,j).

The target standby number of the step i is assigned into g(i,j), where i: a type number, j: a step number.

The loop from step S73 to S78 finds parameters c(i,j) individually for all the types and steps and selects a minimal value min out of the parameters c(i,j).

The parameters c(i,j) are calculated as follows. Here, an explanation will be given below about the case of calculating the parameter c(p,j) of a p-th step of a given type of item. It is to be noted that, in this case, the production process of the type is divided into n(j) steps and the calculation steps of the parameter c(p,j) are from the p+1-th step downward to the final n(j)-th step.

With respect to the target step, differences between target standby numbers g and actual standby numbers w are found and totaled to obtain a sum. By multiplying the obtained sum by the production ratio R(j) inherent in the corresponding type and multiplying the result of multiplication, (R(j)× sum), by (−1) it is possible to calculate the parameter c(p,j) of a p-th step of the type.

And a minimal value min is selected from an i×j number of parameters c(i,j) calculated on a per-type/per-step basis.

At the next step S79, initial values are individually calculated, based on the selected minimal value min, with respect to all the types and all the steps. The initial value is given by subtracting the minimal value min from the parameter c(i,j) calculated by the loop above.

In step S81, a combination is made between the calculated initial value and the step code of the corresponding type calculated at step S80.

(Execution number recording section)

The execution number recording section 2020 has not only the updating section 201, memory section 202 and reading section, as explained in connection with the first embodiment, but also an initial value recording section 204 and production ratio memory section 205.

The memory section 202 and reading section 203 have the same function as set out in connection with the first embodiment, but the updating section 201 is different in function.

The production ratio memory section 205 is provided in main memory 300 and stores, therein, the production ratios corresponding to the types. For example, the production ratio corresponding to the type j is stored in an "r+j" address (four byte long) where r is a constant.

An explanation will be given about the function of the memory 204 and updating section 201 in the control software 301.

The production ratio memory section 205 (1) finds, from the type code j of the production ratio 1630, a corresponding address "r+j" and (2) stores, therein, the reciprocal (R(j)) of a production ratio corresponding to the type j in the "r+j" address.

The execution number storing section (1) finds, from the type/step code i of the initial value, a corresponding address "c+i" and (2) stores the initial value corresponding to the type/step i in the "c+i" address.

The updating section 201 incremented, by "i", the execution number currently stored at the "c+i" address when the operation start information 1500 was input in the first embodiment. In the fourth embodiment, the updating section 201 has the function of weighting the counted execution number with the reciprocal of the production ratio and recording the weighted execution number. That is, it finds the type code j from the type/step code upon receipt of the operation start information 1500 and reads out the production ratio R(j) corresponding to the step above in accordance with an address "r+j" specified by the code. Then it adds the reciprocal R(j) of the production ratio to the execution number read out of the "c+i" address.

(4-3) the whole operation of the production control apparatus

The whole operation of the production control apparatus according to the fourth embodiment will be explained below.

1. First, the standby state of the production machine M0 is started in the standby state recording section 2220.
2. An initializing section 230 triggered by an initialized trigger 1610 calculates the above-mentioned initial value on the basis of the production ratio 1630, target standby state 1620 and standby state and initializes the count value of the execution number recording section 2020.
3. The standby state recorded in the standby state recording section 2220 is updated upon receipt of arrival information 1510 from the production machine M0.
4. Upon receipt of the operation start information 1500 a priority order calculation section 2120 updates priority order information 1560 and outputs the updated priority order information 1560 to the production machine M0.

(4-4) the control of the standby state of the work

With reference to FIGS. 26A to 26D an explanation will be given below about the control production of the fourth embodiment from the standpoint of the variation in the standby state of the work. For ease in explanation, one type of item is handled and the production machine M0 executes all the five steps P1 to P5.

FIG. 26A shows an initial state. In this initial state, the standby numbers of works corresponding to the respective steps are not uniform. The process is directed to making an otherwise irregular standby state a uniform one, that is, a state as shown in FIG. 26D. In this state, the target standby numbers corresponding to the whole process are uniformed to four.

In the initial state of FIG. 26A, the recording section 2020 is initialized to a state calculated with the initializing section 230. Since there is a greater quantity of standby works, for example, in step P2, the step is given a minimal initial value of "0", that is the highest priority order. Since, in this case, those works among these steps are to be controlled, the execution number of the final step P5 is given a remarkably greater number "10" until the standby number is uniformed among these steps.

FIGS. 26B to 26D show a change, from an initial state as shown in FIG. 26A, between the states of the works and those of the execution number recording section 2020 on the production machine M0 involved by making work priority control on the production machine M0 while calculating the priority order by the priority order calculation section 2120.

FIG. 26B shows the state achieved by executing step P2 five times and step P3 twice.

FIG. 26C shows the state achieved by executing work preferentially from the step of a lower execution number (FIG. 26B), that is, the state achieved by executing step P2 three times, step P3 three times and step P4 once. The execution times of these steps (P1 to P4) is incremented to "eight".

FIG. 26D shows the state achieved by executing work preferentially from a lower execution number (FIG. 26C), that is, the state achieved by executing step P1 twice, step P2 twice, step P3 twice and P4 twice. As a result, the execution numbers of steps P1 to P5 are uniformed all to "10" and the standby numbers of the works are uniformed among these steps.

By initializing the execution numbers by the initializing section 230 and weighting the execution numbers with the production ratio as set out above, it is possible to control a standby number variation distribution to a desired configuration on a per-step basis.

Although the production machine M0 alone is displayed for ease in explanation, it is to be noted that, normally, those steps executed by an additional machine or machines are inserted among these steps P1 to P5. If, in such a state, works present in the steps executed by the production machine M0, more accurately, including some work in a standby state present in the additional production machine are uniformly distributed, it is possible to, upon occurrence of faults in the production machine, restrict its adverse effect to a local area.

(4-5) the control of a ratio of one type to another

In the method for controlling the distribution of the standby numbers of the works above, a single type is handled, but even if a plurality of types are produced, it is possible to realize proper control by weighting the execution number with a corresponding production ratio.

Here it is assumed that there exist three types a. b and c and the ratio of their production is 1:2:2. Then it follows that the reciprocal of the production ratio will be 1,½,½.

Since the reciprocal of the production ratio is lowered when there is more production quantity, even if the actual execution number of these types b, c of more production quantities, that is, not-weighted execution number, is greater than the execution number of the type a of less production quantity, it is possible that the weighted execution numbers will be equal to one another. In this example, when the actual execution number of the types b, c is just two times as great as that of the type a, their weighted execution numbers will become equal in these three types. That is, in order to make their weighted execution numbers equal, selection is made of the type processed at a corresponding step.

(4-6) the distribution control of three types

An explanation will be given below about the case of controlling the distribution of the standby numbers with respect to the target standby numbers on a per-type/per-step basis under the equal three types and planned production ratio.

Figure 27A:
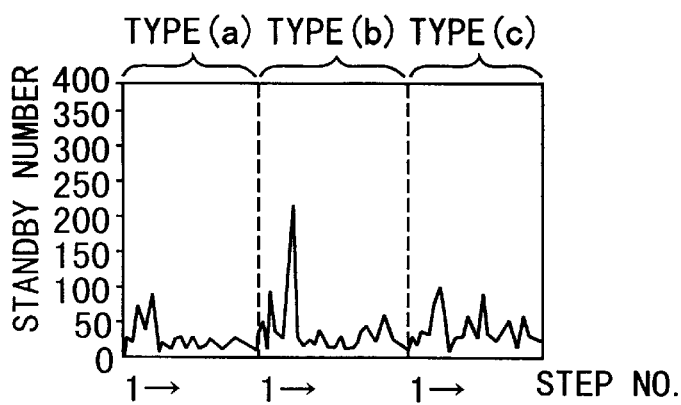
FIGS. 27A to 27E show a time transition of standby numbers relating to three types under priority control by the fourth embodiment.
Figure 27B:
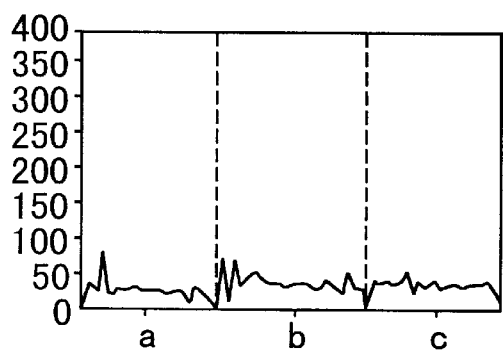
Figure 27D:
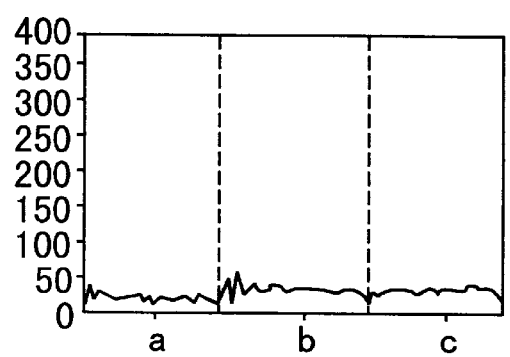
Figure 27C:
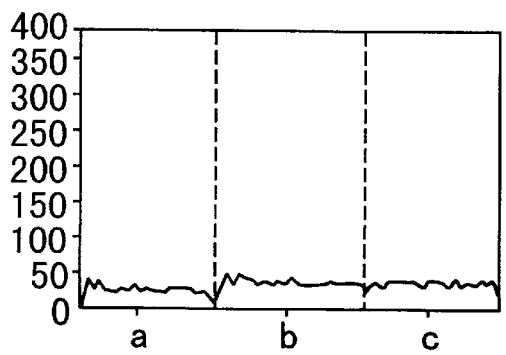
Figure 27E:
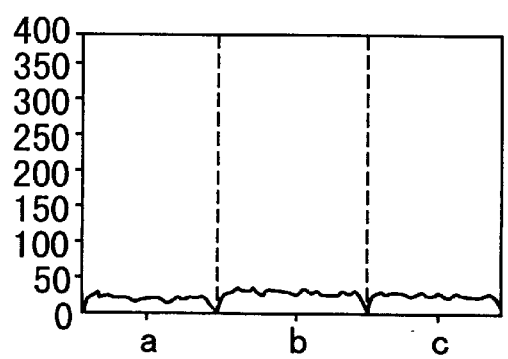
Figure 28:
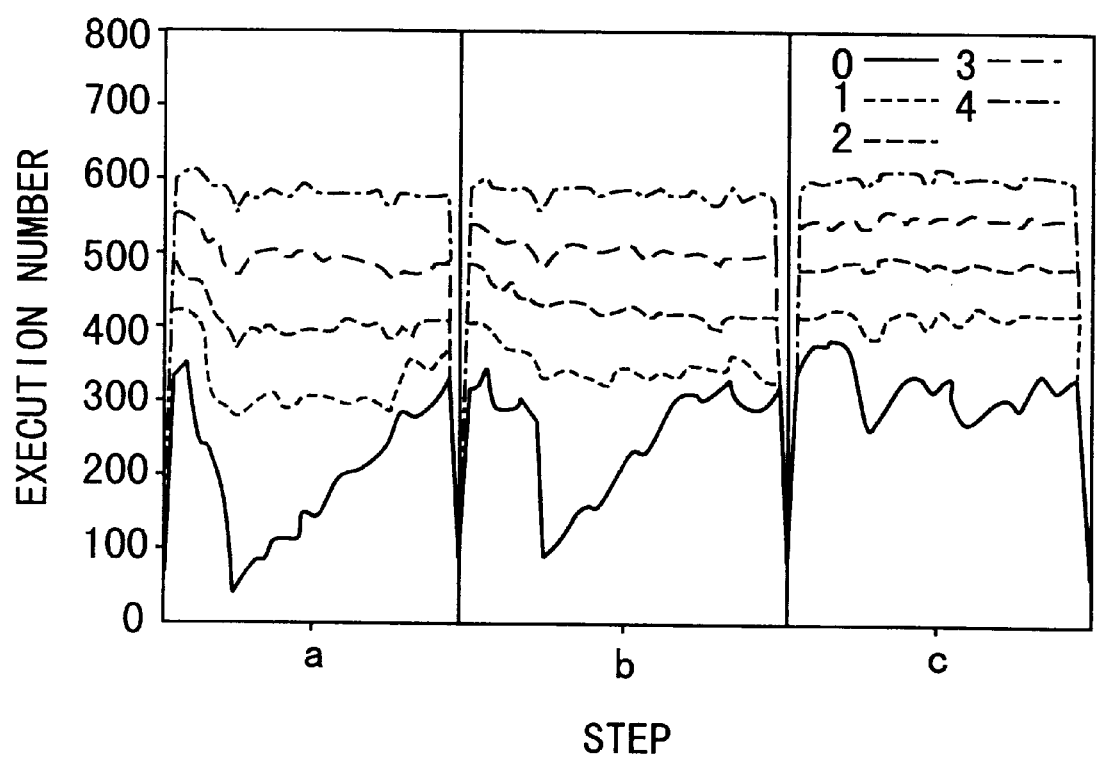
FIG. 28 is a view showing a time transition of execution numbers under priority control by the fourth embodiment.

With reference to FIGS. 27A to 27D and 28, the priority control of the fourth embodiment will be explained below from the standpoint of a time transition relating to the distribution of the standby numbers and that of the execution numbers. On the abscissa of a graph in FIGS. 27A to 27D and 28, the first to the last step regarding the three types a, b, c individually are represented in a left-to-right direction in accordance with the sequence of the process steps. On the ordinate of the graph in FIGS. 27A to 27E, the standby number is represented and FIG. 28 represents the initialized and weighted execution number. FIG. 27A shows the initial state and the lapse of time from the initial state of FIG. 27A toward the state of FIG. 27E. FIG. 28 represents a lapse of time from "0" toward "4".

In the initial state, as seen from FIG. 27A, the standby numbers are not uniform in the types and in the steps involved. Here, the target standby state is given as the state in which the standby numbers are uniformed toward the same value.

If, at each available state of the production machine, work is progressed in accordance with the priority order output from the production control apparatus of the present invention, the standby numbers are approximate to uniform state with a lapse of time as shown in FIGS. 27B to 27E.

The transition of the execution numbers corresponding to the lapse of time as shown in FIGS. 27B to 27E is as shown in FIG. 28. The initial value of FIG. 28 is a value calculated at the initializing section 230 on the basis of the standby numbers (FIG. 28), target standby number 1620 and production ratio. Because of a large deviation among the standby numbers there occurs a large variation in the initial value among the steps.

With a lapse of time, the weighted execution numbers are increased as a whole, but the differences in the types and in the steps become smaller. This obeys the rule under which the smaller the weighted execution number of the steps the higher the priority order.

It is important to note, here, that the weighted execution numbers are uniform among the types a, b, c. As already set out above, the planned production ratio of a, b, c is 1:2:2 and, even in the periods illustrated here, the process is executed at this ratio and the weighted execution numbers also correspond to this ratio. The values as shown in FIG. 28 correspond to those obtained by multiplying the reciprocal of the actual execution numbers by the production ratio, that is, multiplying a by 1, b by ½ and c by ½, so that, after the lapse of a four unit time, these values become substantially equal irrespective of the types involved.

(4-7) the effect

According to the fourth embodiment, as set out above, those process history values recorded by the execution number recording section 2020 are multiplied by the production ratio on a per-type basis and, even if the production output differs on a per-type basis, it is possible to freely control the production ratio.

Further, the initializing section 230 calculates the value corresponding to the initial state of the process history (for example, the execution numbers of the respective steps for the respective types) on the basis of the standby state information 1580 of the respective steps for respective types on the production machine to be controlled at the time of starting the control and initially set target standby state 1620 and, by doing so, initializes the process history of the execution number recording section 2020. As a result, the priority order calculation section 2120 can decide the priority order so as to enable the standby numbers of the respective steps for the respective types to go nearer to the target.

(Fifth Embodiment)

The variants of the first to fourth embodiments will be explained below as a fifth embodiment of the present invention.

Although the above-mentioned embodiments have been explained under the various restricted conditions, it is possible to eliminate these conditions as will be set out below.

1. An object to be controlled by the production control apparatus can be not only a single production machine but also a plurality of production machines or a production line as a whole. Although, in the above-mentioned embodiments, the single production machine is treated as the object to be controlled, it is also possible to control a production machine group with a plurality of production machines having a wholly or partly similar function and a shared portion of a process at the same step or to control a production line involving many production machines (these may constitute a production machine group).

An explanation will be given below about the fifth embodiment while comparing with the first embodiment.

(a) the case of controlling the production apparatus group

In this case, as shown in FIG. 29, one set of standby areas 540 is provided for a production machine group 550 and, even if any production machine 500 in the production machine group 550 becomes available, one work of the highest priority order is selected from the standby area in accordance with an output of the production control apparatus and the process is started.

Even if a given step is finished on the production machine 500 in the production machine group 550, checking is made on the priority order information 1560 output from the production control apparatus 1 so as to select a step to be next done as well as on the standby state of a work 502 waiting at the standby area 540 to select, out of those steps having at least one work in the standby state, one step of the highest priority order and to start a step on its head work. This process is the same as in FIG. 6.

(b) the case of controlling the production line

FIG. 30 shows the location of a production control apparatus 1 for controlling a production line 560, comprised of two production machine groups G1, G2.

The production line is comprised of six steps P1, P2, . . . , P6 with the steps P1, P3, P5 handled by the production machine group G1 and steps P2, P4, P6 handled by the production machine group G2.

The production machine groups G1 and G2, each, are comprised of six production machines with the machines MA, MB of these being of a multi-function type and being shared between the two production machine groups. That is, the steps P1, P2, . . . , P6 can be executed by the production machines MA, MB.

The production control machine has a structure as shown in FIG. 31 and is of a type similar to that of the first embodiments but is different from the latter with respect to step numbers involved. The production control apparatus 1 receives operation start information 1500 and outputs priority order information 1560.

A priority order calculation section 210 finds the priority order information 1560 with respect to the whole process of the production line 560.

In order that, even if any given step is ended by any production machine of any particular production machine group in the production line 560, any given work to be next processed may be selected, checking is made on the priority order information 1560 output from the production control apparatus 1 and on any work 502 waiting at the standby area 540. Out of those steps to be processed by the production apparatus (production apparatus group), one step of the highest priority order is selected with respect to its work in the standby state, and a corresponding step is started on its head work. This operation process is as shown in FIG. 6.

When, for example, any production machine belonging to the production apparatus group G2 becomes available, if it is the production machine MC, any given step of a height priority order is selected from the steps P2, P4, P6, because it belongs to the production machine group G2, so that this step is started. If, on the other hand, the production machine MA is involved, a step of the highest priority order is selected out of the sixth steps P1, P2, . . . , P6, because it belongs to the production machine group G1, and that step starts its operation.

2. A different data length can be used for the embodiment above. Although, for example, the length of the step code is set to one byte, if 256 or more steps are involved, it is necessary to use a step code of a byte larger than this.

In the case where, as in the standby state memory section 2200 in FIG. 8, the effective data is only the lowest one bit in spite of the respective four byte, it is possible, according to this embodiment, to store the presence or absence of the works in the standby state corresponding to 32 steps on a one-address four-byte (32 bits) basis.

3. It is possible to handle any given number of steps.

4. It is possible to handle any given number of types.

5. It is possible to record information other than the execution numbers (or weighted execution numbers).

Although, in the explanation of the third embodiment, the standby time in the work standby state recording section is contained in the evaluation value, it can be realized by, for example, arranging, in an execution order, operation times and work ID's contained in an operation start information 1500 and recording them as a history in an execution number memory section 202.

6. Although, upon supplying the execution number information 1520 from the execution number reading section 203 to the calculation section 211, only the information corresponding to the start step is so sent, it is also possible to read information corresponding to all steps or some steps from the execution number memory section 202 and send it. At this time, the calculation section 211 sequentially calculates evaluation values with respect to the read-out steps and records them to the evaluation value memory section 212.

7. The execution numbers are variously prepared as the evaluation function and, by doing so, it is possible to use values derived from such execution numbers. For example, in the evaluation values of the respective step it may be possible to contain a lapse time relating to the lastly executed step involved. In this case it becomes possible to effect control under which too long interval is not involved between the steps.

In the scope of the above-mentioned embodiment, no "overtaking" of a given work occurs in one step at the standby area, but it may be possible to use any evaluation function with which overtaking occurs. In the case where any appointed time of delivery is set for a given work for instance, if an evaluation function containing a given evaluation value for the appointed time of delivery is used, it becomes possible that such overtaking will occur.

8. The case of using the execution numbers.

(a) The counter can undergo a given count change by being stepped not only by +1 but also by any value including a negative quantity.

(b) The counter can undergo a given count change by setting the operation time length of the step, the product of the operation time length and processing time, etc.

(c) The resetting of the counter can be done in a continuous way by changing the execution numbers stored in the execution number memory section 202.

9. Although the step in-line section 213 allows the step codes to be arranged under the rule of an increasing order of the "execution numbers", any other step determining rule may be adopted, such as the rule of a decreasing order of the "execution numbers" in which case use is made of an evaluation function 1010 for outputting those evaluation values appropriate for the order of the "execution numbers".

10. Although, in the fourth embodiment, the initializing trigger 1610 is sent to the initializing section 230, this function can be achieved by sending, instead of the initializing trigger 1610, the production ratio 1630 or target standby state 1620.

11. In the fourth embodiment, it is possible to omit the production ratio 1630 and production ratio memory section 205 in the case where only one type is handled as an object and where the production quantities of the respective types are equal.

Finally, an explanation will be given below about an improvement of the present apparatus over that of JPN PAT APPLN KOKOKU PUBLICATION NO. 6-328351. According to the present invention, when the execution number recording section 200 records the execution numbers thus reached, that is, when the execution number recording section 200 serves as a counter, only one counter is involved for changing a value when a work is handled by that work step. A production ratio control apparatus described in JPN PAT APPLN KOKOKU PUBLICATION NO. 6-328351 can achieve part of the production control apparatus of the present invention. However, it is necessary to change the values of counters one less than the number of types at the time of starting an operation. According to the present invention, it is possible to reduce an operation quantity of the counter when compared with the Publication above.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. A production control apparatus adapted to a production machine for producing a product from a material in a process divided in a plurality of steps, comprising:
   means for counting execution numbers at respective steps;
   means for allocating a priority order to the respective steps on the basis of the counted execution numbers; and
   means for outputting information on the priority order to the production machine.

2. The apparatus according to claim 1, wherein the allocating means allocates the priority order on the basis of the execution numbers and standby times of works at the respective steps.

3. The apparatus according to claim 2, wherein the allocating means allocates the priority order on the basis of a value obtained by subtracting the standby time from a respective value obtained by multiplying the respective execution number by a constant.

4. The apparatus according to claim 1, further comprising means for calculating an initial value on the basis of a number of works in a standby state at the respective steps and a target number of works in a standby state and means for initializing a count value of the counting means to the calculated initial value.

5. The apparatus according to claim 4, wherein the initializing means comprises means for calculating the a difference between the number of works in the standby state at the respective steps and the target number of works, means for totaling each difference relative to a step downstream of the respective steps and for obtaining respective total values, means for selecting a minimal value from th respective total values, and means for obtaining initial values at the respective steps by subtracting the selected minimal value from the respective total values.

6. A production control apparatus adapted to a production machine for producing a product from a material in a process divided into a plurality of steps, comprising:
   means for counting execution numbers at respective steps;
   means for selecting a highest priority step from the steps on the basis of the counted execution numbers and standby states of standby works at the respective steps; and
   means for outputting information on the selected highest priority step to the production machine.

7. The apparatus according to claim 6, wherein the selecting means for selecting, as the highest priority order step, a step of the lowest execution number which has at least one work in the standby state.

8. The apparatus according to claim 6, wherein the selecting means selects the highest priority order step on the basis of the execution numbers and standby times of standby works at the respective steps.

9. The apparatus according to claim 8, wherein the selecting means selects the highest priority order step on the basis of a value obtained by subtracting the standby time from a value obtained by multiplying the execution number by a constant.

10. The apparatus according to claim 6, wherein a standby state of a standby work is given according to whether or not there is at least one work in the standby state at the respective steps.

11. The apparatus according to claim 6, wherein a standby state of a standby work is given by a number of works in the standby state at the respective steps.

12. The apparatus according to claim 6, further comprising means for calculating an initial value on the basis of a number of works in the standby state at the respective steps and a target number of works in the standby state and means for initializing a counted value of the counting means to the initial value.

13. The apparatus according to claim 12, wherein the initializing means comprises means for calculating a difference between the number of works in the standby state at the respective steps and the target number of works, means for totaling each difference relative to a step downstream of the respective steps and for obtaining respective total values, means for selecting a minimal value from the respective total values, and means for obtaining initial values at the respective steps by subtracting the selected minimal value from the respective total values.

14. A production control apparatus adapted to a production machine for producing a product from a material in a process divided into a plurality of steps, comprising:
   means for counting execution numbers at respective steps;
   means for selecting a highest priority order work from the steps on the basis of the counted execution numbers and standby states of standby works at the respective steps; and
   means for outputting a work code corresponding to the selected highest priority order work.

15. The apparatus according to claim 14, wherein the selecting means selects the highest priority order work on the basis of an execution number and standby time of a standby work at a respective step.

16. The apparatus according to claim 15, wherein the selecting means selects the highest priority work on the basis of a value obtained by subtracting the standby time from a value obtained by multiplying the execution number by a constant.

17. The apparatus according to claim 14, further comprising means for calculating an initial value on the basis of the number of works in a standby state at the respective steps and a target number of works in the standby state and means for initializing a count value of the counting means to the initial value.

18. The apparatus according to claim 17, wherein said initialing means comprises means for calculating a difference between the number of works in the standby state and the target number of works, means for totalizing each difference relative to a step downstream of the respective steps and for obtaining respective total values, means for selecting a minimal value from the respective total values, and means for obtaining initial values at the respective steps by subtracting the selected minimal value from the respective total values.

19. A production control apparatus adapted to a production machine for producing a product from a material in a process divided into a plurality of steps, comprising:

means for counting execution numbers on a per-type/per-step basis;

means for weighting the counted execution numbers on the basis of a production ratio inherent in the respective type;

means for allocating a priority order to the steps on the basis of the weighted execution numbers; and means for outputting information relating to the priority order to the production machine.

20. The apparatus according to claim 19, wherein the allocating means allocates a higher priority order to a step corresponding to a lower weighted execution number.

21. The apparatus according to claim 19, wherein the allocating means allocates a priority order on the basis of the weighted execution numbers and standby times of a standby works at the respective steps.

22. The apparatus according to claim 21, wherein the allocating means allocates the priority order on the basis of a value obtained by subtracting a standby time from a value obtained by multiplying a weighted execution number by a constant.

23. The apparatus according to claim 19, further comprising means for calculating an initial value on the basis of a number of works in a standby state at the respective steps and target number of works in the standby state and means for initializing a counted value of the counting means to the initial value.

24. The apparatus according to claim 23, wherein the initializing means comprises means for calculating a difference between the number of works in the standby state and the target number of works, means for totalizing each difference relative to a step downstream of the respective steps to obtain respective total values, means for selecting a minimal value from a respective total values, and means for obtaining initial values at the respective steps by subtracting the selected minimal value from the respective total values.

25. A production control apparatus adapted to a production machine for producing a product from a material in a process divided into a plurality of steps, comprising:

means for counting execution numbers on a per-type/per-step basis;

means for weighting the counted execution numbers on the basis of a production ratio inherent in the respective type;

means for selecting a highest priority order step from these steps on the basis of the weighted execution numbers and standby states of standby works at the respective steps; and means for outputting information relating to the selected highest priority order step to the production machine.

26. The apparatus according to claim 25, wherein the selecting means selects, as the highest priority order step, a step having a lower weighted execution number with at least one work in a standby state.

27. The apparatus according to claim 25, wherein the selecting means selects the highest priority order step on the basis of the weighted execution numbers and standby times of the standby works at the respective steps.

28. The apparatus according to claim 27, wherein the selecting means selects the highest priority order step on the basis of a value obtained by subtracting a standby time from a value obtained by multiplying a weighted execution number by a constant.

29. The apparatus according to claim 25, wherein a standby state of a standby work is given according to whether or not there is at least one work in the standby state at the respective steps.

30. The apparatus according to claim 25, wherein a standby state of a standby work is given by a number of works in the standby state at the respective steps.

31. The apparatus according to claim 25, further comprising means for calculating an initial value on the basis of a number of works in a standby state at the respective steps and a target number of works in the standby state and means for initializing a count value of the counting means to the initial value.

32. The apparatus according to claim 31, wherein the initializing means comprises means for counting a difference between the number of works in the standby state and the target number of works on the per-type/per-step basis, means for totalizing each difference relative to a step downstream of the respective steps to obtain respective total values on the per-type/per-step basis, means for selecting a minimal value from the respective total values, and means for obtaining the initial value on the per-type/per-step basis by subtracting the selected minimal value from the respective total values.

33. A production control apparatus adapted to a production machine for producing a plurality of types of products from a material in respective processes each divided into a plurality of steps, comprising:

means for counting execution numbers on a per-type/per-step basis;

means for weighting the counted execution numbers on the basis of a production ratio inherent in the types of products;

means for selecting a highest priority order work on the basis of the weighted execution numbers and standby states of standby works at the respective steps; and means for outputting a work code corresponding to the selected highest priority order work to the production machine.

34. The apparatus according to claim 33, wherein the selecting means selects the highest priority order work on the basis of the weighted execution numbers and standby times of the standby works at the respective steps.

35. The apparatus according to claim 34, wherein the selecting means selects the highest priority order work on the basis of a value obtained by subtracting a standby time from a value obtained by multiplying a weighted execution number by a constant.

36. The apparatus according to claim 33, further comprising means for calculating an initial value on the basis of a number of works in a standby state at the respective steps and a target number of works in the standby state and means for initializing a count value of the counting means to the initial value.

37. The apparatus according to claim 36, wherein the initializing means comprises means for counting a difference between the number of works in the standby state and the target number of works on the per-type/per-step basis, means for totalizing each difference relative to a step downstream of the respective steps to obtain respective total values on the per-type/per-step basis, means for selecting a minimal value from the respective total values, and means for obtaining the initial value on the per-type/per-step basis by subtracting the selected minimal value from the respective total values.

38. A production control method for controlling a production machine for producing a product from a material in a process divided into a plurality of steps, comprising the steps of:

counting execution numbers at respective steps;

allocating a priority order to the respective steps on the basis of the counted execution numbers; and outputting information relating to the priority order to the production machine.

39. The method according to claim 38, wherein the allocating step allocates the priority order to the respective steps on the basis of the execution numbers and standby time of a standby work at the respective steps.

40. The method according to claim 39, wherein the allocating step comprises a substep for allocating the priority order to the respective steps on the basis of a value obtained by subtracting the standby time from a value obtained by multiplying an execution number by a constant.

41. The method according to claim 38, further comprising the step of calculating an initial value on the basis of a number of works in a standby state at the respective steps and a target number of standby works in the standby state and initializing a count value of the counting step to the initial value.

42. The method according to claim 41, wherein the initializing step comprises a substep of calculating a difference between the number of works in the standby state and the target number of standby works, a substep of obtaining respective total values at the respective steps by totalizing each difference relative to a step downstream of the respective steps, a substep for selecting a minimal value from the respective total values, and a substep of obtaining the initial value at a respective step by subtracting the selected minimal value from a respective total value.

43. A production control method for controlling a production machine for producing a product from a material in a process divided into a plurality of steps, comprising the steps of:

counting execution numbers at respective steps;

selecting a priority order step from the counting step on the basis of the counted execution numbers and standby state of standby works at the respective steps; and outputting information relating to the selected priority order step to the production machine.

44. The method according to claim 43, wherein the selecting step comprises a substep of selecting, as the priority order step, a step having at least one work at the standby state and lowest execution number.

45. The method according to claim 43, wherein the selecting step comprises a substep of selecting a highest priority order step on the basis of the execution numbers and standby time of the standby works at the respective steps.

46. The method according to claim 45, wherein the selecting step comprises a substep of selecting the highest priority order step on an basis of a value obtained by subtracting the standby time from a value obtained by multiplying the execution number by a constant.

47. The method according to claim 43, wherein the standby state of a standby work is given according to whether or not there is at least one work at the respective steps.

48. The method according to claim 43, wherein the standby state of a standby work is given by a number of works in the standby state at the respective steps.

49. The method according to claim 43, further comprising the step of calculating an initial value on the basis of a number of works in the standby state at the respective steps and initializing a count value of the counting step to the calculated initial value.

50. The method according to claim 49, wherein the initializing step comprises a substep of calculating a difference between the number of works in the standby state and a target number, a substep of totalizing each difference relative to a step downstream of the respective steps to obtain respective total values, a substep of selecting a minimal value from the respective total values, and a substep of obtaining the initial value on a per-step basis by subtracting the selected minimal value from the respective total values.

51. A production control method for controlling a production machine for producing a product from a material in a process divided into a plurality of steps, comprising the steps of:

counting execution numbers at respective steps;

selecting a highest priority work on the basis of the counted execution numbers and standby works at the respective steps; and outputting a work code corresponding to the selected highest priority order work to the production machine.

52. The method according to claim 51, wherein the selecting step comprises a substep of selecting the highest priority order work on the basis of the execution numbers and standby time of the standby works at the respective steps.

53. The method according to claim 52, wherein the selecting step selects the highest priority order work on the basis of a value obtained by subtracting the standby time from a value obtained by multiplying an execution time by a constant.

54. The method according to claim 51, further comprising the step of calculating an initial value on the basis of a number of works in a standby state at the respective steps and a target number of works in a standby state and initializing a count value of the counting step to the calculated initial value.

55. The method according to claim 54, wherein the initializing step comprises a substep of calculating a difference between the number of works in the standby state and the target number of works, a substep of totalizing each difference relative to a step downstream of the respective steps on a per-step basis to obtain respective total values, a substep of selecting a minimal value from the respective total values, and a substep of obtaining the initial value by subtracting the selected minimal value from the respective total values.

56. A production control method for controlling a production machine for producing a product from a material in a process divided into a plurality of steps, comprising the steps of:

counting execution numbers on a per-type/per-step basis;

weighting the counted execution numbers on the basis of a production ratio inherent in respective types;

allocating a priority order to the steps on the basis of the weighted execution numbers; and outputting information relating to the priority order to the production machine.

57. The method according to claim 56, wherein the allocating step comprises a substep of imparting a higher priority order to a step the lower an execution number of the step.

58. The method according to claim 56, wherein the allocating step allocates the priority order on the basis of a weighted execution number and standby time of standby works in a respective step.

59. The method according to claim 58, wherein the allocating step comprises a substep of allocating the priority order on the basis of a value obtained by subtracting the standby time from a value obtained by multiplying the weighted execution number by a constant.

60. The method according to claim 56, further comprising a step of calculating an initial value on a basis of the number of works in a standby state and a target number of standby works and initializing a count value of the counting step to the calculated initial value.

61. The method according to claim 60, wherein the initializing step comprises a substep of calculating a difference between the number of works in the standby state and the target number of standby works on a per-step basis, a substep of totalizing each difference relative to a step downstream of the respective steps to obtain respective total values, a substep of selecting a minimal value from the respective total values, and a substep of obtaining the initial value by subtracting the selected minimal value from the respective total values.

62. A production control method for controlling a production machine for producing a product from a material in a process divided into a plurality of steps, comprising the steps of:

counting execution numbers on a per-type/per-step basis;
weighting the counted execution numbers on the basis of a production ratio inherent in the types of items;
selecting a highest priority order step from the steps on the basis of the weighted execution numbers and standby state of standby works at the respective steps; and
outputting information relating to the selected highest priority order step to the production machine.

63. The method according to claim 62, wherein the selecting means selects, as the highest priority order step, a step having at least one work in a standby state and a lowest weighted execution number.

64. The method according to claim 62, wherein the selecting step has a subset of selecting the highest priority order step on the basis of a weighted execution number and standby time of standby works at a respective step.

65. The method according to claim 64, wherein the selecting means has a subset of selecting the highest priority order step on the basis of a value obtained by subtracting the standby time from a value obtained by multiplying the weighted execution number by a constant.

66. The method according to claim 62, wherein the standby state of the standby works is given according to whether or not there is any one work in the standby state at the respective steps.

67. The method according to claim 62, wherein the standby state of the standby works is given by a number of works in the standby state at the respective steps.

68. The method according to claim 62, further comprising a step of calculating an initial value on a basis of the number of works in the respective steps and a target number of works in a standby state and initializing a count value of the counting step to the calculated initial value.

69. The method according to claim 68, wherein the initializing step comprises a substep of calculating a difference between the number of works in the standby state and the target number of works on the per-type/per-step basis, a substep of totalizing each difference relative to a step downstream of the respective steps to obtain a total value on the per-type/per-step basis, a substep of selecting a minimal value from respective total values, and a substep of obtaining the initial value on the per-type/per-step basis by subtracting the selected minimal value from the respective total values.

70. A production control method for controlling a production machine for producing a product from a material in a process divided into a plurality of steps, comprising the steps of:

counting execution numbers on a per-type/per-step basis;
weighting the counted execution numbers on the basis of a production ratio inherent in the types;
selecting the highest priority order work from the respective steps on the basis of the weighted execution numbers and standby state of standby works at the respective steps; and
outputting a work code corresponding to the selected highest priority order work to the production machine.

71. The method according to claim 70, wherein the selecting step selects the highest priority order work on the basis of the weighted execution numbers and standby time of the standby works at the respective steps.

72. The method according to claim 71, wherein the selecting means selects the highest priority order work on the basis of a value obtained by subtracting the standby time from a value obtained by multiplying a weighted execution number by a constant.

73. The method according to claim 70, further comprising a step of calculating an initial value on the basis of a number of standby works at the respective steps and a target number of works in the standby state and initializing a count value of the counting step to the initial value.

74. The method according to claim 73, wherein the initializing step comprises a substep of calculating a difference between the number of standby works in the standby state and the target number of works on a per-type/per-step basis, a substep of totalizing each difference relative to a step downstream of the respective steps on a per-type/per-step basis to obtain respective total values, a substep of selecting a minimal value from the respective total values, and a substep of obtaining the initial value by subtracting the selected minimal value from the respective total values.

75. A memory storing a computer-executable program incorporated to control a production machine for producing a product from a material in a process divided into a plurality of steps, comprising:

means for counting execution numbers on a per-step basis;
means for allocating a priority order to the steps on the basis of the counted execution numbers; and
means for outputting information relating to the priority order to the production machine.

76. A memory storing a computer-executable program incorporated to control a production machine for producing a product from a material in a process divided into a plurality of steps, comprising:

means for counting execution numbers on a per-step basis;
means for selecting a highest priority order step from the steps on the basis of the counted execution numbers and standby states of standby works at the respective steps; and
means for outputting information relating to the selected highest priority order step to the production machine.

77. A memory for storing a computer-executable program incorporated to control a production machine for producing a product from a material in a process divided into a plurality of steps, comprising:

means for counting execution numbers on a per-step basis;

means for selecting a highest priority order work from the steps on the basis of the counted execution numbers and standby states of standby works at the respective steps; and means for outputting a work code corresponding to the selected highest priority order work to the production machine.

78. A memory for storing a computer-executable program incorporated to control a production machine for producing a plurality of types of products from a material in respective processes each divided into a plurality of steps, comprising:

means for counting execution numbers on a per-type/per-step basis;

means for weighting the counted execution numbers on the basis of a production ratio inherent in the types;

means for allocating a priority order to the steps on the basis of the weighted execution numbers; and means for outputting information relating to the priority order to the production machine.

79. A memory for storing a computer-executable program incorporated to control a production machine for producing a plurality of types of products from a material in respective processes each divided into a plurality of steps, comprising:

means for counting execution numbers on a per-type/per-step basis;

means for weighting the counted execution numbers on the basis of a production ratio inherent in the respective types;

means for selecting a highest priority order step from the steps on the basis of the weighted execution numbers and standby states of standby works at the respective steps; and means for outputting information relating to the selected highest priority order step to the production machine.

80. A memory for storing a computer-executable program incorporated to control a production machine for producing a plurality of types of items from a material in respective processes each divided into a plurality of steps, comprising:

means for counting execution numbers on a per-type/per-step basis;

means for weighting the counted execution numbers on the basis of a production ratio inherent in the respective types;

means for selecting a highest priority order work on the basis of the weighted execution numbers and standby states of standby works at the respective steps; and means for outputting a work code corresponding to the selected highest priority order work to the production machine.

* * * * *